(12) United States Patent
Cui et al.

(10) Patent No.: US 12,008,587 B2
(45) Date of Patent: Jun. 11, 2024

(54) METHODS AND APPARATUS TO GENERATE AUDIENCE METRICS USING MATRIX ANALYSIS

(71) Applicant: The Nielsen Company (US), LLC, New York, NY (US)

(72) Inventors: DongBo Cui, New York, NY (US); Edward Murphy, Uncasville, CT (US); Michael Richard Sheppard, Holland, MI (US); David Forteguerre, Brooklyn, NY (US); Jessica Lynn White, Plant City, FL (US); PengFei Yi, Shanghi (CN); Jonathan Sullivan, Hurricane, UT (US)

(73) Assignee: The Nielsen Company (US), LLC, New York, NY (US)

( * ) Notice: Subject to any disclaimer, the term of this patent is extended or adjusted under 35 U.S.C. 154(b) by 241 days.

(21) Appl. No.: 17/406,878

(22) Filed: Aug. 19, 2021

(65) Prior Publication Data
US 2022/0058663 A1 Feb. 24, 2022

Related U.S. Application Data

(60) Provisional application No. 63/106,242, filed on Oct. 27, 2020, provisional application No. 63/068,831, filed on Aug. 21, 2020.

(51) Int. Cl.
*G06Q 30/0201* (2023.01)
*G06F 17/16* (2006.01)
*G06F 18/10* (2023.01)

(52) U.S. Cl.
CPC ......... *G06Q 30/0201* (2013.01); *G06F 17/16* (2013.01); *G06F 18/10* (2023.01)

(58) Field of Classification Search
None
See application file for complete search history.

(56) References Cited

U.S. PATENT DOCUMENTS

| | | | |
|---|---|---|---|
| 2013/0036082 A1* | 2/2013 | Natarajan | G06Q 30/00 706/50 |
| 2015/0193813 A1* | 7/2015 | Toupet | G06Q 30/0242 705/14.41 |

(Continued)

OTHER PUBLICATIONS

Grabocka et al. "Classification of Sparse Time Series via Supervised Matrix Factorization." Proceedings of the Twenty-Sixth AAAI Conference on Artificial Intelligence, pp. 928-934, © 2012. (Year: 2012).*

(Continued)

*Primary Examiner* — Susanna M. Diaz

(57) ABSTRACT

An example apparatus includes audience metrics collecting circuitry to access first audience metrics from a server, and access second audience metrics from the server, matrix building circuitry to build a matrix of the first audience metrics and the second audience metrics, missing values of the matrix corresponding to the second audience metrics, data transforming circuitry to transform the first audience metrics and the second audience metrics in the matrix, missing value calculating circuitry to determine imputed transformed values of the missing values using a recommender system, and the data transforming circuitry to recover imputed values of the missing values based on the imputed transformed values.

20 Claims, 14 Drawing Sheets

(56) References Cited

U.S. PATENT DOCUMENTS

| | | | |
|---|---|---|---|
| 2015/0242751 A1* | 8/2015 | Zhang | G06F 17/16 706/46 |
| 2015/0262207 A1* | 9/2015 | Rao | G06Q 30/0203 705/7.32 |
| 2017/0004526 A1* | 1/2017 | Morovati | H04N 21/25866 |
| 2017/0091794 A1* | 3/2017 | Sheppard | G06Q 30/0204 |

OTHER PUBLICATIONS

Salinas et al. "Efficient Sparse Outsourcing of Large-Scale Sparse Linear Systems of Equations." IEEE Transactions on Big Data, vol. 4, No. 1, Jan.-Mar. 2018. (Year: 2018).*

* cited by examiner ional Patent Application No. 63/068,831, filed Aug. 21, 2020, is hereby claimed. U.S. Provisional Patent Application No. 63/106,242 and U.S. Provisional Patent Application No. 63/068,831 are hereby incorporated herein by reference in their entireties.

METHODS AND APPARATUS TO GENERATE AUDIENCE METRICS USING MATRIX ANALYSIS

RELATED APPLICATION

Priority to U.S. Provisional Patent Application No. 63/106,242, filed Oct. 27, 2020, and U.S. Provis

FIELD OF THE DISCLOSURE

This disclosure relates generally to computer-based audience measurement and, more particularly, to methods and apparatus to generate audience metrics using matrix analysis.

BACKGROUND

Determining a size and demographics of an audience of a media presentation helps media providers and distributers schedule programming and determine prices for advertising presented during the programming. In addition, accurate estimates of audience demographics enable advertisers to target advertisements to certain types and/or sizes of audiences. To collect these demographics, an audience measurement entity enlists a group of media consumers (often called panelists) to cooperate in an audience measurement study (often called a panel). In some examples, the audience measurement entity obtains (e.g., directly, or indirectly from a media service provider) return path data from media presentation devices (e.g., set-top boxes) that identifies tuning data from the media presentation devices. In such examples, because the return path data may not be associated with a known panelist, the audience measurement entity models and/or assigns viewers to represent the return path data. In some examples, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

The figures are not to scale. In general, the same reference numbers will be used throughout the drawing(s) and accompanying written description to refer to the same or like parts.

Figure 1:
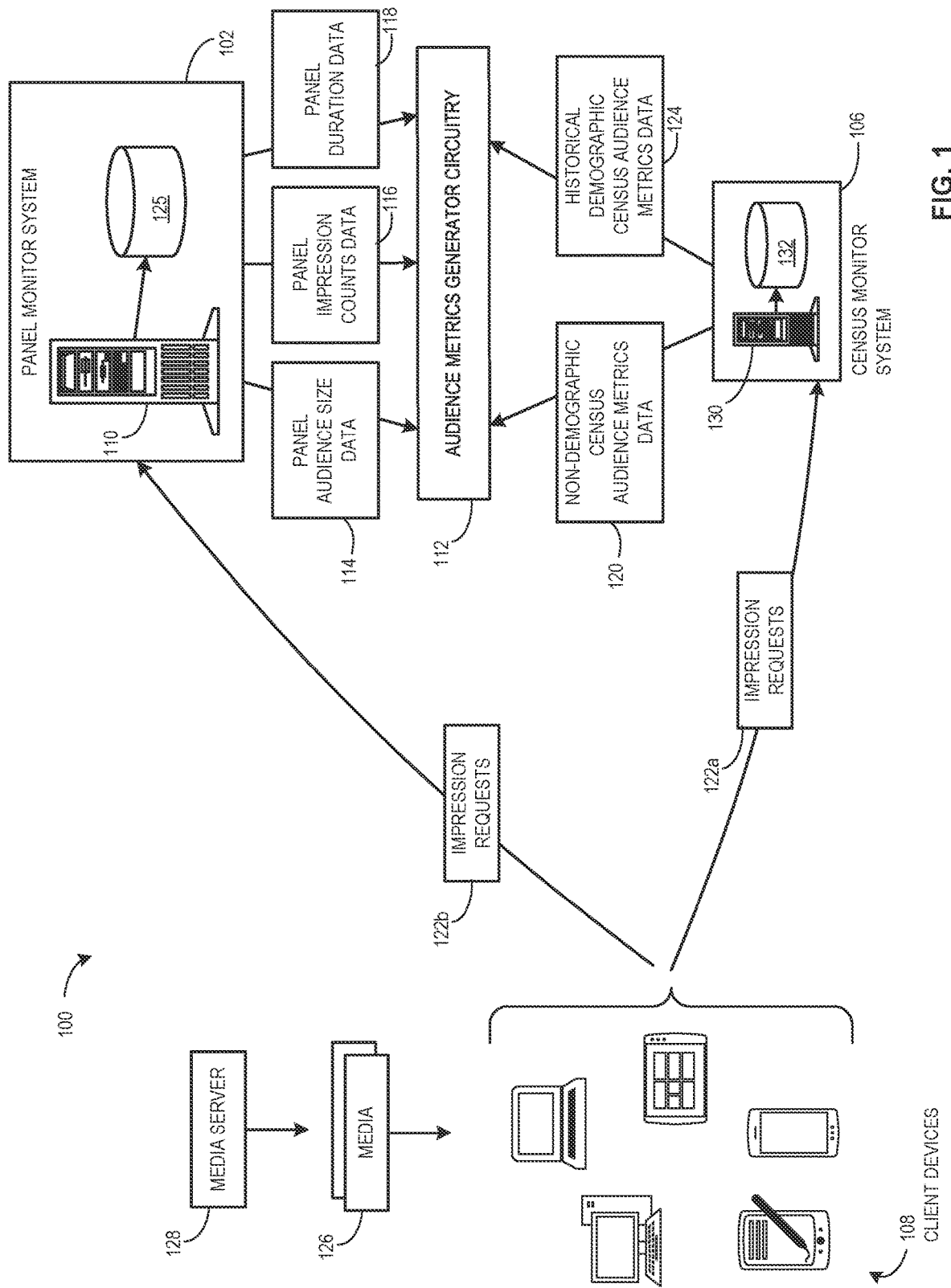
FIG. 1 is an example system for logging impressions of media accesses via client devices.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client device requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client device and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when the subscribers visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated herein by reference in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client device accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client device to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or network communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching the Walking Dead television program on a television as part of TV media, pause the program, and continue to watch the program on a tablet as part of DTV media. In such an example, the access of the program may be logged by an AME twice, once for an impression log associated with the television-based access, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from database proprietors, use of third-party cookies may be limited or may cease in some or all online markets. That is, with fewer or no opportunities to use third-party browser cookies and monitoring instructions in media (e.g., pixel tags), examples disclosed herein mitigate reliance on database proprietor data to measure the demographic distributions of an audience and utilize panel data. However, due to its low sample size, not all media can be covered by the panel data. Examples disclosed herein impute values of missing demographics using a recommender system (e.g., sparse matrix factorization, a deep factorization machine, etc.). The disclosed example recommender system technique is powerful enough to impute missing demographic audience size, demographic impression count, and/or demographic duration time values (in some examples all missing values) to determine supplemented audience metrics data with acceptable degrees of accuracy. Examples disclosed herein alleviate the problem of insufficient data to infer audience metrics data and correct biased audience metrics data.

Examples disclosed herein may be used to measure audiences of digital media by analyzing and/or determining demographic distributions of the audiences, as well as impression counts and the durations of exposures of the audiences to media. In prior techniques, third-party audience measurement entities (AMEs) rely on database proprietors (e.g., Data Enrichment Providers (DEPs)) such as Google and Facebook to determine the ages and genders of an audience using third-party browser cookies and pixel tags embedded within the digital media. As database proprietors exit the world of third-party digital media measurement (e.g., eliminate the use of third-party cookies), examples disclosed herein shift reliance from database proprietors to panel data collected by an AME. However, an AME panel, which is a small sample of the population, cannot cover the entirety of the universe of media. Exposing each age and gender group in the AME panel to every piece of media is simply infeasible. Therefore, examples disclosed herein can estimate the amount of exposure of each piece of media for each age and gender group.

Examples disclosed herein provide methods, apparatus and methods of manufacture to estimate missing media exposure data generated when an AME panel does not cover an entirety of the universe of media. Examples disclosed herein also provide method, apparatus and methods of manufacture to estimate missing demographic data for census media impression data wherein only a total impression count is known. In examples disclosed herein, known data is media measurement data tracked and recorded by the AME. In examples disclosed herein, unknown data is media measurement data that the AME is unable to access. As used herein, a known user is a user (e.g., a panelist) with known demographic information. As used herein, an unknown user is a user for which the AME cannot determine demographic information. In some examples the AME collects census data including impression counts of unknown users (e.g., census impression counts), audience sizes of the unknown users (e.g., census audience sizes), and event durations of the unknown users (e.g., census duration times) across media. As used herein, an impression for an unknown user (e.g., a census impression) is an impression that is logged for an access to media by a user for which demographic information is unknown.

Examples disclosed herein generate a training matrix of known audience size, impression count and duration data for a plurality of media across a plurality of demographic groups. Examples disclosed herein include normalizing the data in the matrix, transforming the normalized data to maintain logical relationships between the audience size, impression count and duration data and log the transformed data. Examples disclosed herein determine missing values in the matrix based on known values in the matrix and a recommender system. For example, a sparse matrix factorization algorithm can be used to impute missing matrix values. In some examples, a deep factorization machine is used to impute missing matrix values. In some examples, the media can be grouped into categorical features to improve the quality of the imputed values. Example categorical features include websites, television programs, or product categories (e.g., women's clothing).

FIG. 1 shows an example operating environment 100 that includes an example panel monitor system 102, an example census monitor system 106, example client devices 108, and example audience metrics generator circuitry 112. In some examples, the example panel monitor system 102, the example census monitor system 106, and the example audience metrics generator circuitry 112 are implemented by a single entity such as an AME. In other examples, the example panel monitor system 102 is implemented by a database proprietor, and the example census monitor system 106 and the example audience metrics generator circuitry 112 are implemented by an AME. In yet other examples, each of the example panel monitor system 102, the example census monitor system 106, and the example audience metrics generator circuitry 112 may be implemented by a separate entity.

The example panel monitor system 102 includes an example panel monitor system computer 110 to log panelist media impressions and generate panel audience size data 114, panel impression counts data 116, and panel duration data 118. The panel monitor system computer 110 stores logged panelist media impression records, the panel audience size data 114, the panel impression counts data 116, and the panel duration data 118 in an example panel monitor system database 125. The example audience metrics generator circuitry 112 determines missing audience metrics data (e.g., audience size, impression count and duration data) based on the panel audience size data 114, the panel impression counts data 116, and the panel duration data 118 from the panel monitor system 102 and based on non-demographic census audience metrics data 120 and historical demographic census audience metrics data 124 from the census monitor system 106. In the illustrated example of FIG. 1, the panel monitor system computer 110 can implement an impression monitor system to log media impressions reported by the client devices 108. In the illustrated example of FIG. 1, the client devices 108 may be stationary or portable computers, handheld computing devices, smart phones, Internet appliances, and/or any other type of device that may be connected to the Internet and capable of presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 126 (e.g., an advertisement, a movie, a movie trailer, a song, a web page banner, a webpage, etc.) provided by a media server 128. Examples disclosed herein may be used to monitor for media impressions of any one or more media types (e.g., video, audio, a webpage, an image, text, etc.). In examples disclosed herein, the media 126 may be content and/or advertisements. Examples disclosed herein are not restricted for use with any particular type of media. On the contrary, examples disclosed herein may be implemented in connection with tracking impressions for media of any type or form. As used herein, a duration is defined as a length of time of access and/or exposure to media 126 for a given media impression.

In the illustrated example of FIG. 1, the media server 128 (e.g., hosted by content providers and/or advertisers) distributes the media 126 via the Internet to users that access websites and/or online television services (e.g., web-based TV, Internet protocol TV (IPTV), etc.). Examples disclosed herein can be used to generate audience metrics data of media served by the media server 128 and/or any other entity.

In the example of FIG. 1, the media 126 is presented via the client devices 108. When the media 126 is accessed by the client devices 108, the client devices 108 send impression requests 122a to the census monitor system 106 to inform the census monitor system 106 of the media accesses. In this manner, an example census monitor system computer 130 of the census monitor system 106 can log census-level media impressions in impression records of a census monitor system database 132. In some examples, the client devices 108 also send impression requests 122b to the panel monitor system 102 so that the panel monitor system 102 can log panelist media impressions in the panel monitor system database 125. In the illustrated example of FIG. 1, the panel monitor system 102 logs the panelist media impressions as demographic impressions corresponding to accesses by the client devices 108 to the media 126. Demographic impressions are impressions logged in association with demographic information collected by the panel monitor system 102 from registered panelists. Census-level media impressions (e.g., census impressions) are impressions logged regardless of whether demographic information is known for those logged impressions. historical demographic census audience metrics data 124 historical demographic census audience metrics data 124 In the example of FIG. 1, the census monitor system database 132 includes the non-demographic census audience metrics data 120 which is based on census impressions without demographic information, and the historical demographic census audience metrics data 124 which is based on census impressions with demographic information. For example, the census impressions used to generate the historical demographic census audience metrics data 124 may have been logged with demographic information known at the time of logging or may have been post-processed to supplement with demographic information through, for example, a statistical analysis to infer or impute demographics.

In some examples, the media 126 is encoded to include a media identifier (ID). The media ID may be any identifier or information that can be used to identify the corresponding media 126. In some examples the media ID is an alphanumeric string or value. In some examples, the media ID is a collection of information. For example, if the media 126 is an episode, the media ID may include program name, season number, and episode number. When the media 126 includes advertisements, such advertisements may be content and/or advertisements. The advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc.

In some examples, the media 126 of the illustrated example is tagged or encoded to include monitoring instructions or tag instructions, which are computer executable monitoring instructions (e.g., Java, java script, or any other computer language or script) that are executed by web browsers that access the media 126 via, for example, the Internet. Execution of the monitoring instructions causes the web browser to send the impression requests 122a,b (e.g., also referred to as tag requests) to one or more specified servers (e.g., via URLs) of the panel monitor system 102 and/or the census monitor system 106. As used herein, tag requests 122a,b are used by the client devices 108 to report occurrences of media impressions caused by the client devices 108 accessing the media 126. In the illustrated example, the tag requests 122a include user-identifying information that the panel monitor system 102 can use to identify the panelist that accessed the media 126. For example, when a panelist of the panel monitor system 102 installs an on-device meter on a client device 108, the on-device meter sets a panelist cookie on the client device 108 and maps that cookie to the panelist's identity/account information at the panel monitor computer 110. In examples disclosed herein, panelist identity and/or panelist account information includes personally identifiable information (PII) such as full name, street address, residence city and state, telephone numbers, email addresses, ages, dates of birth, social security numbers, demographic information, and/or any other person information provided by panelists that enroll in the panel and agree to have their internet activities monitored by the panel monitor system 102. By having such PII information mapped to panelist cookies, the panel monitor system 102 can subsequently identify the panelist based on the panelist cookie to determine when that panelist accessed different media 126 and to log an impression in association with demographics and/or other PII information of that panelist. In the illustrated example of FIG. 1, the impression requests 122b include panelist cookies of the client devices 108 to inform the panel monitor system 102 of the particular panelists that accessed the media 126.

The tag requests 122a,b may be implemented using HTTP requests. However, whereas HTTP requests are network communications that traditionally identify web pages or other resources to be downloaded, the tag requests 122a,b of the illustrated example are network communications that include audience measurement information (e.g., ad campaign identification, content identifier, and/or user identification information) as their payloads. The server (e.g., the panel monitor system computer 110 and/or the census monitor system computer 130) to which the tag requests 122a,b are directed is programmed to log occurrences of impressions reported by the tag requests 122a,b. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 126 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 126 is accessed at the client device 108 and causes the client device 108 to send one or more of the impression requests 122a,b to report the access to the media 126. In such examples, the data collector can obtain user identifiers and/or device identifiers stored in the client devices 108 and send them in the impression requests 122a,b to enable the census monitor system 106 and/or the panel monitor system 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

Figure 2:
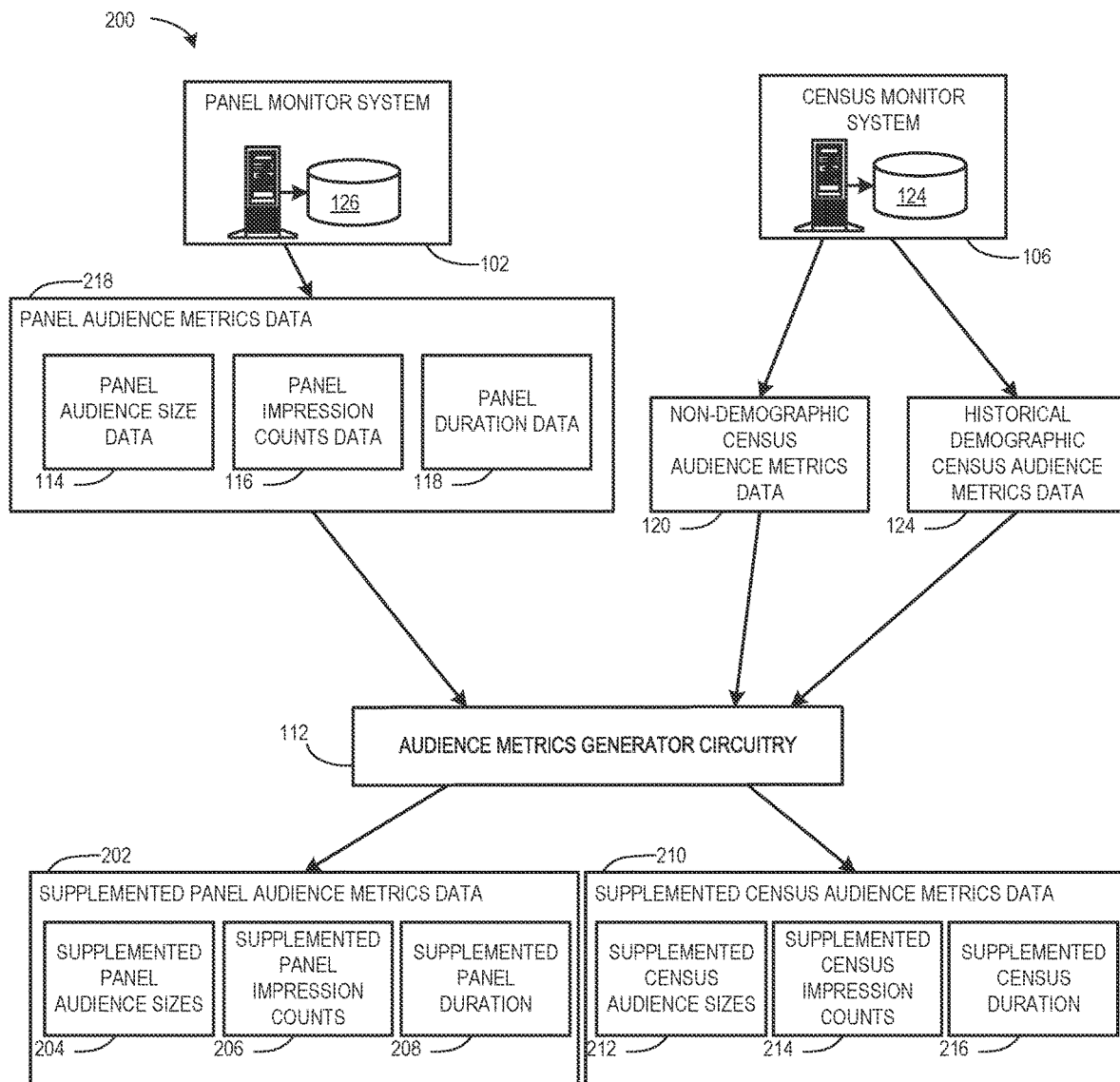
FIG. 2 is a schematic illustration of an example process flow of audience metrics generator circuitry to estimate panel and census metrics data.

FIG. 2 is an example process flow 200 of the audience metrics generator circuitry 112 to determine metrics including supplemented panel metrics data 202 (e.g., supplemented panel audience sizes 204, supplemented panel impression counts 206, supplemented panel duration 208) and supplemented census metrics data 210 (e.g., supplemented census audience sizes 212, supplemented census impression counts 214, and supplemented census duration 216). In examples disclosed herein, data is supplemented when it is provided with additional information fill missing data. In examples disclosed herein, additional information includes audience sizes, impression counts, and/or durations of media accesses for different demographic categories (e.g., male 18-25, female 18-25, male 26-30, female 26-30, etc.). The example audience metrics generator circuitry 112 generates the audience metrics for a plurality of media items across a plurality of demographic categories based on the audience metrics data provided by the panel monitor system 102 (e.g., the panel audience size data 114, the panel impression counts data 116, the panel duration data 118) and the census monitor system 106 (e.g., the non-demographic census audience metrics data 120, the historical demographic census audience metrics data 124). The example process flow 200 of FIG. 2 begins when the panel monitor system 102 generates panel audience metrics data 218 (e.g., the panel audience size data 114, the panel impression counts data 116, the panel duration data 118) based on logging impressions of the media 126 (FIG. 1) accessed by panelists. In some examples, the panel monitor system 102 anonymizes the panel audience metrics data 218 by aggregating the panel audience metrics data 218 by demographic category, thus, removing PII of panelists. As it is infeasible to expose panelists in each of the plurality of the demographic categories to each of a plurality of media items of the media 126, the panel audience metrics data 218 includes audience metrics data for only a portion of demographics categories for the media 126. Another portion of the demographic categories correspond to missing values (e.g., missing audience size, missing impression count, missing duration) in the panel audience metrics data 218 in which no data exists for panelist accesses to the media 126 for a given demographic group. Thus, the panel audience metrics data 218 is an incomplete (e.g., sparsely populated) data set. In the example of FIG. 2, the panel monitor system 102 sends the panel audience metrics data 218 to the example audience metrics generator circuitry 112.

Additionally, the example census monitor system 106 generates non-demographic census audience metrics data 120 based on logging impressions of the media 126 (FIG. 1). The non-demographic census audience metrics data 120 does not include demographic information but includes only total audience metrics (e.g., total impression count, total duration) across all demographic categories for the media 126. In the illustrated example, the non-demographic census audience metrics data 120 does not include deduplicated audience size data. Thus, the non-demographic census audience metrics data 120 is an incomplete (e.g., sparsely populated) data set with regard to demographics information. The example census monitor system 106 has access to the historical demographic census audience metrics data 124 which includes demographic data. Thus, the historical demographic census audience metrics data 124 is a demographic-supplemented data set. In some examples, the historical demographic census audience metrics data 124 is a complete (e.g., fully populated) data set in that all demographic information is provided for the audience metrics data in historical demographic census audience metrics data 124. The example historical demographic census audience metrics data 124 can be used as training data for statistical models (e.g., recommender systems). In the example of FIG. 2, the census monitor system 106 sends the non-demographic census audience metrics data 120 and the historical demographic census audience metrics data 124 to the example audience metrics generator circuitry 112. The example audience metrics generator circuitry 112 utilizes the panel audience metrics data 218, the non-demographic census audience metrics data 120 and the historical demographic census audience metrics data 124 to determine supplemented panel audience metrics data 202 and supplemented census audience metrics data 210. The supplemented panel audience metrics data 202 includes the panel audience metrics data 218 and imputed values for a portion of the demographic categories which did not include data in the panel audience metrics data 218. Thus, the supplemented panel audience metrics data 202 includes panel audience metrics (e.g., audience size, impression counts, durations) for the media 126 across each of the plurality of the demographic categories or demographics groups. The supplemented census audience metrics data 210 includes the non-demographic census audience metrics data 120 and imputed values for the demographics information for the non-demographic census audience metrics data 120. Thus, the supplemented census audience metrics data 210 includes census audience metrics (e.g., audience size, impression counts, durations) for the media 126 across each of the plurality of the demographic categories or demographic groups.

Figure 3:
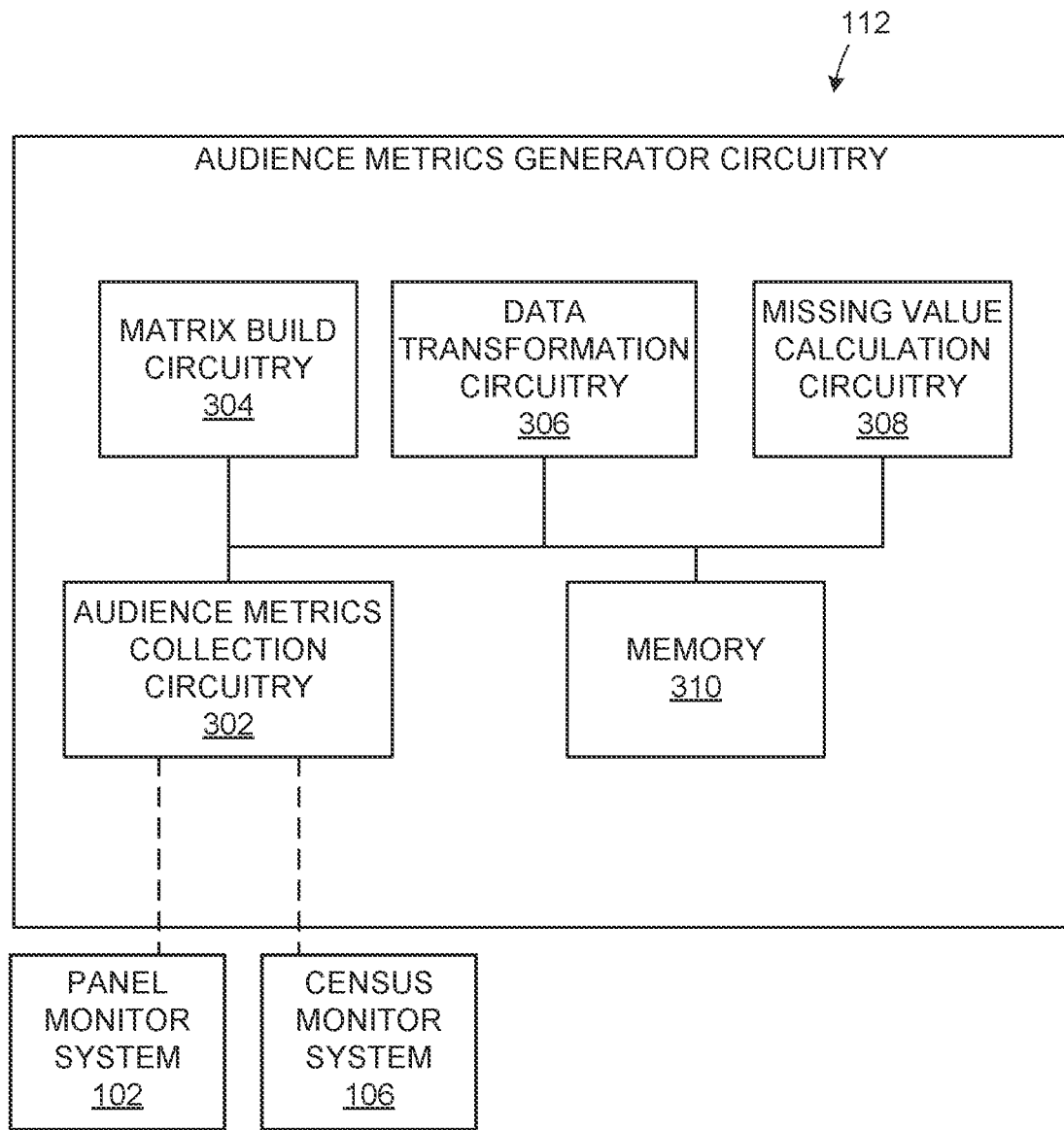
FIG. 3 is a block diagram of the example audience metrics generator circuitry of FIGS. 1 and 2.

FIG. 3 is a block diagram of the example audience metrics generator circuitry 112 of FIGS. 1 and 2. In the example of FIG. 3, the audience metrics generator circuitry 112 includes audience metrics collection circuitry 302. The example audience metrics collection circuitry 302 communicates with the panel monitor system 102 and the census monitor system 106. For example, the audience metrics collection circuitry 302 receives audience metrics data (e.g., the panel audience metrics data 218, the non-demographic census audience metrics data 120, the historical demographic census audience metrics data 124) from the panel monitor system 102 and/or the census monitor system 106. In some examples, the audience metrics collection circuitry 302 sends audience metrics data (e.g., supplemented panel audience metrics data 202, supplemented census audience metrics data 210) to the panel monitor system 102 and/or the census monitor system 106.

The example audience metrics generator circuitry 112 includes matrix build circuitry 304. The example matrix build circuitry 304 compiles audience metrics data into a matrix for further processing by the audience metrics generator circuitry 112. For example, the audience metrics collection circuitry 302 passes the received metrics data (e.g., the panel audience metrics data 218, the non-demographic census audience metrics data 120, the historical demographic census audience metrics data 124) to the matrix build circuitry 304. The example matrix build circuitry 304 compiles the metrics data into a format used by a recommender system (e.g., a matrix factorization model and/or a deep factorization machine) to determine supplemented audience metrics data. For example, the recommender system may determine supplemented audience metrics data by using a user-item data structure such as the one shown in example Table 1. The user-item data structure of example Table 1 associates users with a rating or score for items accessed by those users. As shown in example Table 1, a user (e.g., User1) that accessed an item (e.g., Item1) is associated with a rating and/or a score (e.g., 4.0) corresponding to the item. In the example of Table 1, the ratings and/or scores are on a scale of 0.5-5 to indicate strengths of associations between the users and the items. As shown in Table 1, not all users are exposed to all items and, thus, the recommender system data structure is sparsely populated with rating data. In examples disclosed herein, the audience metrics generator circuitry 112 generates an audience metrics matrix (e.g., shown in example Table 2 below) similar to the structure of Table 1 to generate audience metrics based on demographics and media items. For example, the plurality of demographic groups can be treated as the user dimension of the user-item data structure of Table 1, the plurality of media items can be treated as the item dimension of the user-item data structure and the audience sizes, impression counts, and duration times can be treated as the ratings or scores in the user-item data structure. In some examples, the matrix includes feature information (e.g., a category feature, a continuous feature). Example Table 2 below demonstrates an example implementation of an audience metrics matrix in which audience metrics is data compiled into a user-item data structure.

TABLE 1

EXAMPLE RECOMMENDER SYSTEM DATA STRUCTURE

|  | User1 | User2 | User3 | ... |
|---|---|---|---|---|
| Item1 | 4.0 |  | 2.0 |  |
| Item2 | 3.0 | 3.5 |  |  |
| Item3 |  | 5.0 |  |  |
| Item4 |  |  | 2.5 |  |
| ... | ... | ... | ... | ... |

TABLE 2

EXAMPLE AUDIENCE METRICS MATRIX

| | Audience | | | Impressions | | | Duration | | |
|---|---|---|---|---|---|---|---|---|---|
| | Demo1 | Demo2 | ... Total | Demo1 | Demo2 | ... Total | Demo1 | Demo2 | ... Total |
| Media1 | 2 |  | ... 5 | 6 |  | ... 10 | 57 |  | ... 197 |
| Media2 |  | 6 | ... 12 |  | 16 | ... 43 |  | 37 | ... 138 |
| Media3 | 3 | 4 | ... 24 | 14 | 18 | ... 37 | 21 | 57 | ... 104 |
| ... | ... | ... | ... ... | ... | ... | ... ... | ... | ... | ... ... |

In the above example Table 2, there are missing values for some of the demographic groups for some of the media items. In the example of panelist audience metrics data 218, as described above, as it is infeasible to expose panelists in each of the demographic groups to each of the media items. Thus, there can be missing values in an example audience metrics matrix such as Table 2. In the example of census data, the AME may not be able to access demographic information for each of the users, thus resulting in missing values. In the Example Table 2, for the Demo2-Media1 relationship, missing values are shown as a missing audience size, a missing impression count, and a missing duration. A missing audience size, a missing impression count, and a missing duration are also shown for the Demo1-Media2 relationship.

The example audience metrics generator circuitry 112 includes data transformation circuitry 306. The example data transformation circuitry 306 transforms data in audience metrics matrices. For example, the data transformation circuitry 306 can prepare the data in the audience metrics matrix of Table 2 for use by the recommender system. For example, the data transformation circuitry 306 normalizes and/or transforms the data in the audience metrics matrix to maintain logical relationships between matrix values, improve computation efficiency and/or improve a quality of imputed values by the recommender system. In some examples, the data transformation circuitry 306 recovers imputed values from the audience metrics matrix. Further details of the data transformation circuitry 306 are discussed in conjunction with FIG. 4.

The example audience metrics generator circuitry 112 includes missing value calculation circuitry 308. The example missing value calculation circuitry 308 uses a recommender system to impute missing values in audience metrics matrices. In some examples, the recommender system is a machine learning system that utilizes collaborative filtering (CF) to impute values for missing audience sizes, missing impression counts, and missing durations. The recommender system can be used to impute values for missing scores or ratings in the example recommender system data structure. For example, if the recommender system is used on the data structure of Table 2, an impression count can be imputed for access to a media item (e.g., Media2) by a demographic group (e.g., Demo1) which has a missing value in the data structure. For example, the recommender system can estimate that Demo1 has an impression count of 2 for Media2. In some examples, the recommender system imputes values for each of the missing values in the data structure. Thus, after applying the recommender system to the data structure, a supplemented ratings matrix is generated.

In some examples, the recommender system is a sparse matrix factorization model. The sparse matrix factorization model can be implemented using the following example methods. Given a user-item rating matrix S (e.g., the example recommender system data structure of Table 1), each missing element (e.g., an audience size, an impression count, a duration) of the matrix can be imputed according to example Equation 1 below. In example Equation 1, $\hat{s}_{ij}$ represents a supplemented user-item rating matrix, $\vec{u}_i$ represents the i-th row vector of an item matrix U with a size n×k, $\vec{w}_j$ represents the j-th row vector of a user matrix W with a size m×k, k represents the length of the feature vectors, $b_i$ represents the bias associated with the item dimension, $c_j$ represents the bias associated with the user dimension, and μ represents a global mean of the rating sparse matrix. Example Equation 1 can be modified to account for the mean across the rows (e.g., a mean across items for each user) yielding example Equation 2 below in which $v_j$ represents a mean of each column of the available data in the sparse matrix associated with the user dimension.

$$\hat{s}_{ij} = \vec{u}_i \cdot \vec{w}_j + b_i + c_j + \mu \quad \text{(Equation 1)}$$

$$\hat{s}_{ij} = \vec{u}_i \cdot \vec{w}_j + b_i + c_j + \mu + v_j \quad \text{(Equation 2)}$$

The sparse matrix factorization model is to minimize a regularized least squares cost, J, as defined in example Equation 3 below in which Ω represents a set of indices where the sparse matrix S has rating data, λ represents an L2 regularization term, $\|\cdot\|_F$ represents a Frobenius Norm, and $\|\cdot\|_2$ represents an L2 norm. Taking the derivative of J with respect to the model parameters, setting them to zero and solving for each parameter results in example Equations 4-7 below. In the following equations, $\theta_j$ represents a set of data points for the j-th user/demographic, $\Psi_i$ represents a set of data points for the i-th item, and $|\cdot|$ represents a cardinality of a set.

$$J = \sum_{i,j\in\Omega}(s_{ij}-\hat{s}_{ij})^2 + \lambda(\|U\|_F^2 + \|W\|_F^2 + \|b\|_2^2 + \|c\|_2^2) \quad \text{(Equation 3)}$$

$$u_i := \sum_{i\in\theta_j}\vec{u}_i^T + \lambda\Big)^{-1}\sum_{i\in\theta_j}(s_{ij}-b_i-c_j-\mu-v_j)\vec{u}_i \quad \text{(Equation 4)}$$

$$w_i := \sum_{j\in\Psi_i}\vec{w}_j\vec{w}_j^T + \lambda\Big)^{-1}\sum_{j\in\Psi_i}(s_{ij}-b_i-c_j-\mu-v_j)\vec{w}_j \quad \text{(Equation 5)}$$

$$b_i := \frac{1}{|\Psi_i|+\lambda}\sum_{j\in\Psi_i}(s_{ij}-\vec{u}_i\cdot\vec{w}_j-c_j-\mu-v_j) \quad \text{(Equation 6)}$$

$$c_i := \frac{1}{|\theta_j|+\lambda}\sum_{i\in\theta_j}(s_{ij}-\vec{u}_i\cdot\vec{w}_j-c_j-\mu-v_j) \quad \text{(Equation 7)}$$

The sparse matrix factorization model can solve for the four parameters defined in equations 4-7 ($u_i$, $w_i$, $b_i$, and $c_i$). One example method to solve for the four variables is an alternating least squares (ALS) method. For example, using ALS, the four variables ($u_i$, $w_i$, $b_i$, and $c_i$) are updated one by one after first holding other parameters as constants. ALS can be implemented for Matrix Factorization using the below Algorithm 1. Using the below example Algorithm 1, the parameter updates alternate between the item dimension and the user dimension. For example, first the parameters corresponding to the item dimension ($u_i$ and $b_i$) are updated. Subsequently, the parameters corresponding to the user dimension ($w_i$ and $c_i$) are updated. The below example Algorithm 1 can be trained over a number of epochs or iterations. In some examples, Algorithm 1 can be trained over a set number of epochs or iterations (e.g., 100 iterations). In other examples, Algorithm 1 can be trained until a convergence criterion (e.g., mean squared error) is below a threshold.

---

Algorithm 1
ALTERNATING LEAST SQUARES FOR
MATRIX FACTORIZATION

---

Result: u, w, b, c
Randomly initalize u, w, b, c;
for ( ep = 0; ep < epochs; ep++) {
  for ( i = 0; i < n; i++) {
    Update u;
    Update b;
  }
  for (j = 0; j < m; j++) {
    Update w;
    Update c;
  }
}

---

In the example of the sparse matrix factorization model, each of the items in the user-item matrix is treated independently. However, in some examples, an audience metrics distribution pattern of items with a first feature may differ from an audience metrics distribution pattern of media items with a second feature. For example, media items accessed on a first type of user device (e.g., a mobile phone) can have a different audience metrics distribution than media items accessed on a second type of user device (e.g., a desktop computer). In other examples, media items accessed on a first website (e.g., a sports news website) can have a different audience metrics distribution than media items accessed on a second website (e.g., an online marketplace). Thus, in some instances, examples disclosed herein are implemented by incorporating feature groupings in the recommender system. In such examples, incorporating feature groupings in the recommender system improves a quality of the predicted values (e.g., estimations of the imputed values for missing audience metrics data).

In some examples, the recommender system is a deep factorization machine. The example deep factorization machine includes a capability to incorporate feature groupings in generating predicted or imputed values. The example deep factorization machine includes a factorization machine (FM) and a deep learning neural network component (e.g., multilayer perceptron (MLP)). The deep factorization machine can be represented by example Equation 8 below in which $\hat{y}$ are predicted values, x are input features, $\hat{y}(x)$ represents the deep factorization machine, $\hat{y}_{FM}(x)$ represents the factorization machine (FM), and $\hat{y}_{MLP}(x)$ represents the multilayer perceptron model.

$$\hat{y}(x) = \hat{y}_{FM}(x) + \hat{y}_{MLP}(x) \quad \text{(Equation 8)}$$

Example Equation 9 below represents the FM model wherein $w_0 \in \mathbb{R}$ represents a global mean, $w_i \in \mathbb{R}^n$ represents first order feature weights, $V \in \mathbb{R}^{n \times k}$ represents second order feature interaction weights, vi represents an i-th row of V, k represents a number of latent factors, and $\langle \cdot, \cdot \rangle$ represents a dot product operation.

$$\hat{y}_{FM}(x) = w_0 + \sum_{i=1}^{n} w_i x_i + \sum_{i=1}^{n}\sum_{j=i+1}^{n}\langle v_i, v_j\rangle x_i x_j \quad \text{(Equation 9)}$$

Example Equation 10 below represents Equation 9 with the terms rearranged. Examples disclosed herein which use Equation 10 can yield a more efficient optimization scheme. In example Equation 10, f represents an index of the latent factors. Embedding of a feature x can be represented by example Equation 11 below. Thus, factorization can be represented by example Equation 12 below in which $e^{(1)}$ represents a first order embedding and $e^{(2)}$ represents a second order embedding.

$$\hat{y}_{FM}(x) = \quad \text{(Equation 10)}$$
$$w_0 + \sum_{i=1}^{n} w_i x_i + \frac{1}{2}\sum_{f=1}^{k}\left(\left(\sum_{i=1}^{n} v_i, f^{x_i}\right)^2 - \sum_{i=1}^{n}(v_i, f^{x_i})^2\right)$$

$$e(x) = w^T x \quad \text{(Equation 11)}$$

$$\hat{y}_{FM}(x) = \quad \text{(Equation 12)}$$
$$w_0 + \sum_{i=1}^{n} e_i^{(1)} + \frac{1}{2}\sum_{f=1}^{k}\left(\left(\sum_{i=1}^{n} e_{i,f}^{(2)}\right)^2 - \sum_{i=1}^{n}\left(e_{i,f}^{(2)}\right)^2\right)$$

The input of the deep learning model is represented by concatenated embeddings represented in example Equation 13 below. Thus, the multilayer perceptron layer can be expressed as example Equation 14 below in which $\alpha$ represents an activation function, $W^{(l)}$ represents a weight of the l-th layer, $z^{(l-1)}$ represents the output from the previous layer l−1, and $b^{(l)}$ represents a bias of the l-th layer.

$$z^0 = [e_1^{(2)}, e_2^{(2)}, \ldots] \quad \text{(Equation 13)}$$

$$z^{(l)} = \alpha(W^{(l)} z^{(l-1)} + b^{(l)}) \quad \text{(Equation 14)}$$

The deep factorization machine is described in further detail below along with FIG. 5. The example audience metrics generator circuitry 112 of FIG. 3 includes example memory 310. The example memory 310 can be a volatile or non-volatile memory used to store inputs and outputs of the audience metrics generator circuitry 112. For example, the matrix can be stored in the memory 310.

Figure 4:
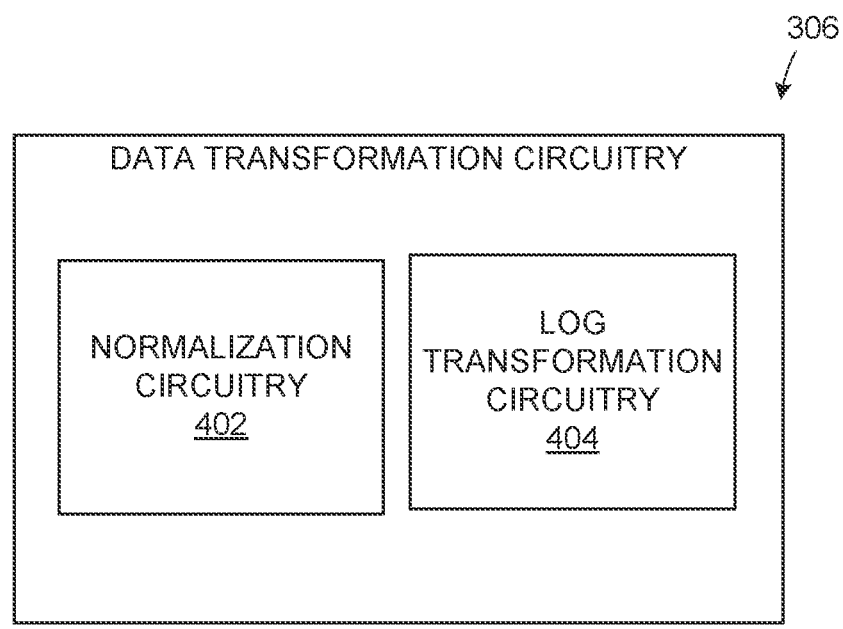
FIG. 4 is a block diagram of the example data transformer circuitry of FIG. 3.

FIG. 4 is a block diagram of the example data transformation circuitry 306 of FIG. 3. The example data transformation circuitry 306 includes example normalization circuitry 402 and example log transformation circuitry 404. As discussed above, the example data transformation circuitry 306 transforms data in an audience metric matrix. For example, the data transformation circuitry 306 can impose logical relationships on the audience metrics data (e.g., the panel audience metrics data 218, the non-demographic census audience metrics data 120, and the historical demographic census audience metrics data 124) in the matrix. The recommender system of the missing value calculation circuitry 308 (FIG. 3) does not include relationships between the audience size/impression count/duration dimension and the media item dimension shown in Table 2 above, and assumes all the audience sizes/impression counts/durations and all the media items are independent of one another. However, the audience metrics data included in the matrix includes logical relationships. For example, in Equation 15 below, A represents an audience size, R represents an impression count, and D represents audience duration for a media item. Example Equation 15 below can be used to represent the logical relationships between the audience sizes, the impression counts, and the durations given that there is at least a one impression threshold to be satisfied for a particular audience to be included in the measurement and at least a one second duration threshold of viewing to be satisfied for that impression to be treated as a valid impression. Additionally, example Equation 16 below represents the relationship between the audience size and U, the universe estimate, in which the audience size should not exceed a total population to be measured (e.g., the universe estimate, U).

$$A \leq R \leq D \quad \text{(Equation 15)}$$

$$A \leq U \quad \text{(Equation 16)}$$

The example normalization circuitry 402 can normalize the audience sizes, the impression counts, and the durations data in the matrix based on the universe estimate to generate normalized matrix data. The normalization performed by the example normalization circuitry 402 can also account for the logical relationships between the audience sizes, the impression counts, and the durations data. For example, Equations 17-19 below can be used to normalize the audience sizes, impression counts, and durations data. In example Equations 17-19 below, $\alpha$ represents normalized audience data, r represents normalized impression data, $R_{max}$ represents a maximum impression value, d represents normalized duration data, and $D_{max}$ represents a maximum duration value.

$$a = \frac{A}{U} \quad \text{(Equation 17)}$$

$$r = \frac{R - A}{R_{max}} \quad \text{(Equation 18)}$$

$$d = \frac{D - R}{D_{max}} \quad \text{(Equation 19)}$$

The example normalization circuitry 402 can transform the normalized matrix data for numerical stability. For example, Equations 20-22 below can be used to transform the normalized matrix data. In example Equations 20-22, $S_A$ represents transformed audience data, $S_R$ represents transformed impression data, and $S_D$ represents transformed duration data. The 100% factors in Equations 20-22 are included for the purpose of numerical stability of the recommender system.

$$S_A = \frac{a}{1-a} \times 100\% \quad \text{(Equation 20)}$$

$$S_R = \frac{r}{1-r} \times 100\% \quad \text{(Equation 21)}$$

$$S_D = \frac{d}{1-d} \times 100\% \quad \text{(Equation 22)}$$

Additionally, the example normalization circuitry 402 can reverse the normalization to recover metrics data. For example, Equations 23-28 below can be used to reverse the normalization. In example Equations 23-28, â represents imputed normalized audience data, $\widehat{S_A}$ represents imputed transformed impression data, $\hat{r}$ represents imputed normalized impression data, $\widehat{S_R}$ represents imputed transformed impression data, $\hat{d}$ represents imputed normalized duration data, $\widehat{S_D}$ represents imputed transformed duration data, $\hat{A}$ represents imputed audience data, $\hat{R}$ represents imputed impression data, and $\hat{D}$ represents imputed duration data.

$$-\hat{a} = \frac{S_A}{100 + S_A} \quad \text{(Equation 23)}$$

$$-\hat{r} = \frac{S_R}{100 + S_R} \quad \text{(Equation 24)}$$

$$-\hat{d} = \frac{S_D}{100 + S_D} \quad \text{(Equation 25)}$$

$$\hat{A} = \hat{a} \cdot U \quad \text{(Equation 26)}$$

$$\hat{R} = \hat{r} \cdot R_{max} + \hat{A} \quad \text{(Equation 27)}$$

$$\hat{D} = \hat{d} \cdot D_{max} + \hat{R} \quad \text{(Equation 28)}$$

In some examples, the recommender system can impute negative values for missing matrix values. However, audience size values, impression count values, and duration values should always be positive. Thus, the recommender system cannot be applied directly to the audience size values, impression count values, and duration values as illogical negative values could be imputed. In some examples, a log transformation can be used to mitigate logical errors generated by negative imputed values by the recommender system. For example, the normalized matrix can be log transformed. The recommender system can be applied to the log transformed matrix to generate log transformed imputed values. Then, imputed metrics values can be recovered by raising the log transformed imputed values to exponents. Using this method, the imputed metrics values cannot be negative.

Additionally, the normalized matrix values can, in some examples, have a long-tail distribution. For example, a long-tail distribution is seen in demographic-media associations (e.g., the demographic-media associations of Table 2 structured like the user-item interactions of Table 1) in which one or more media items are accessed by a disproportionally large number of audience members. The recommender system is, in some examples, a linear algorithm. However, a long-tail distribution can create difficulties with the linear algorithm. In some examples, the normalized data including a long-tail distribution can be log transformed. The log transformed data can have a distribution which is more suited for the linear algorithm of the recommender system (e.g., normally distributed, symmetric, and/or centered near zero). Thus, log transforming the normalized matrix values can mitigate issues caused by both negative imputed values and long-tail distributions.

Accordingly, the example data transformation circuitry 306 can perform a log transformation on the normalized matrix values in the matrix to prepare the normalized matrix values for processing by the recommender system of the missing value calculation circuitry 308. The example log transformation circuitry 404 performs the logarithmic transformation of the normalized matrix values to generate log transformed matrix values. The log transformed matrix values can be used by the recommender system of the missing value calculation circuitry 308 to impute one or more of estimated audience size values, impression count values, and/or duration values in the missing values of the audience metrics matrix (e.g., the missing values of the audience metrics matrix of Table 2 above).

Figure 5:
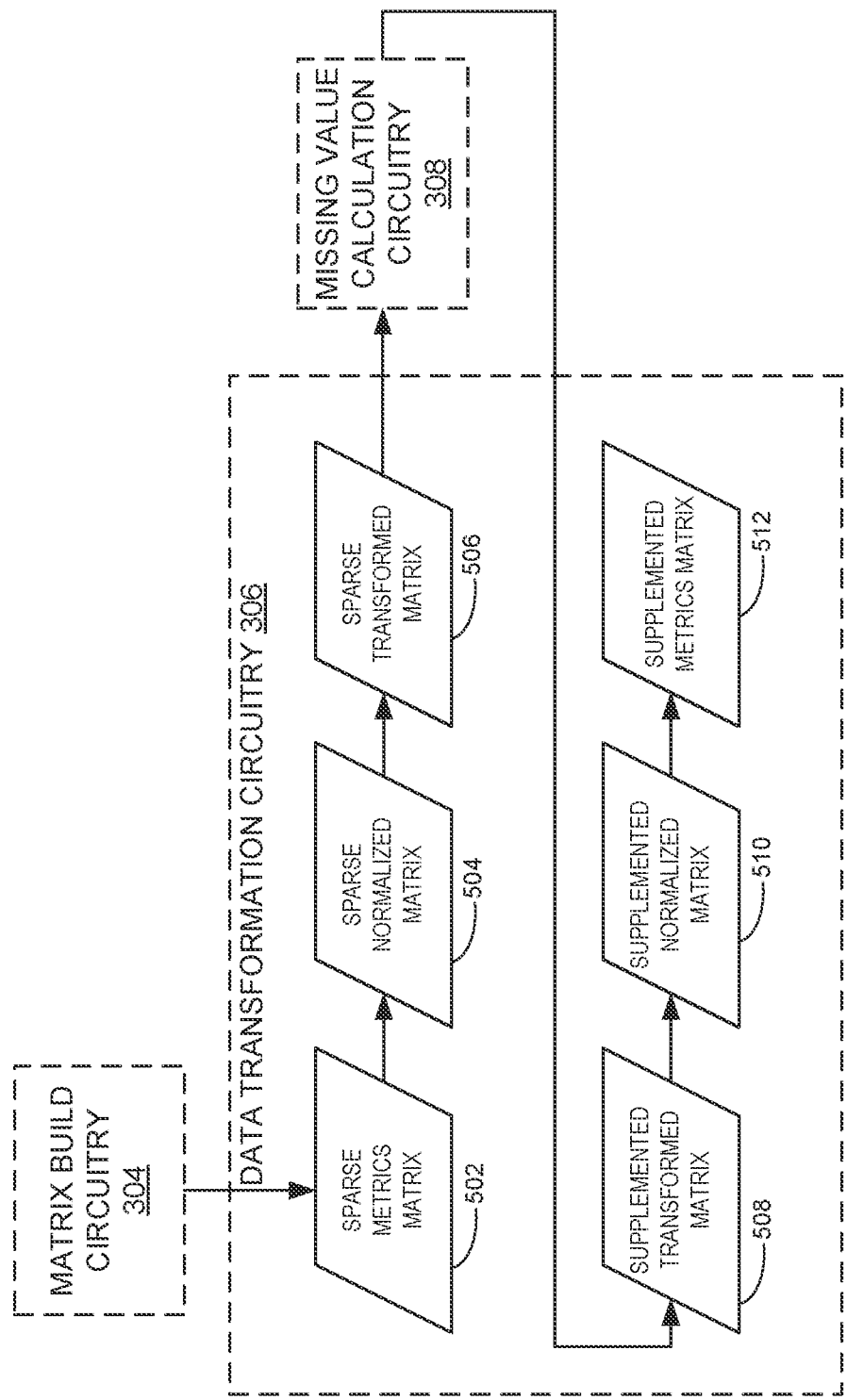
FIG. 5 is a schematic illustration of an example process flow of the data transforming circuitry of FIGS. 4 and 5 to estimate metrics data.

FIG. 5 is a schematic illustration of an example process flow 500 of the audience metrics generator circuitry 112 of FIGS. 1-3 to determine supplemented audience metrics data. The example process flow 500 begins when the example matrix build circuitry 304 compiles audience metrics data into a sparse metrics matrix 502. As discussed above, the panel audience metrics data 218 and the non-demographic census audience metrics data 120 are incomplete (e.g., sparsely populated) data sets. Thus, the matrix compiled by the matrix build circuitry 304 is sparsely populated. In other words, the sparse metrics matrix 502 includes missing audience metrics values for a plurality of the media items for a plurality of the demographic groups. The example data transformation circuitry 306 transforms the sparse metrics matrix 502 into a sparse normalized matrix 504. For example, the normalization circuitry 402 of the data transformation circuitry 306 can apply example Equations 17-22 to the data in the sparse metrics matrix 502. In some examples, the resulting sparse normalized matrix 504 is normalized to the universe estimate. In some examples, the resulting sparse normalized matrix 504 accounts for the logical relationships between the audience sizes, the impression counts, and the duration data. The example data transformation circuitry 306 transforms the sparse normalized matrix 504 into a sparse transformed matrix 506. For example, the log transformation circuitry 404 (FIG. 4) of the data transformation circuitry 306 performs a logarithmic transformation on the data in the sparse normalized matrix 504. In examples disclosed herein, the logarithm transformation uses a natural logarithm with the number e, Euler's number, as the base. In other examples, a logarithm with a different base (e.g., 10) can be used. The sparse transformed matrix 506 is passed to the missing value calculation circuitry 308. As discussed above, the missing value calculation circuitry 308 uses a recommender system (e.g., a sparse matrix factorization model and/or a deep factorization machine) to impute missing values in a matrix. In the example of FIG. 5, the missing value calculation circuitry 308 applies the recommender system to the sparse transformed matrix 506. The recommender system of the missing value calculation circuitry 308 imputes audience metrics values (e.g., one or more of audience size values, impression count values, and/or duration values) for missing values of the sparse transformed matrix 506. As a result, the missing value calculation circuitry 308 determines a supplemented transformed matrix 508. The supplemented transformed matrix 508 is a fully populated data set including the values included in the sparse transformed matrix 506 and imputed audience size values, impression count values, and/or duration values for missing values in the sparse transformed matrix 506.

The supplemented transformed matrix 508 is provided to the data transformation circuitry 306 to recover imputed values for the missing audience metrics data. Because the recommender system was applied to the sparse transformed matrix 506 including transformed media metrics data, the matrix values imputed by the recommender system are similarly transformed. Thus, a reverse transformation is applied to the sparse transformed matrix 508 by executing one or more numerical operations to recover audience metrics values which are no longer transformed. For example, the data transformation circuitry 306 applies reverse transformations to the supplemented transformed matrix 508 to recover the imputed audience metrics values for the missing audience metrics data. For example, the log transformation circuitry 404 of the data transformation circuitry 306 can reverse the log transformation by raising the data in the supplemented transformed matrix 508 to exponents resulting in a supplemented normalized matrix 510. In examples disclosed herein, the number forming the base of the logarithm in the logarithmic transformation is used as the base of the exponent to which the data in the supplemented transformed matrix 508 is raised. For example, the number e, Euler's number, is raised to the power of the data in the supplemented transformed matrix 508 to determine the supplemented normalized matrix 510. Additionally, the example normalization circuitry 402 (FIG. 4) of the data transformation circuitry 306 can reverse the normalization transformation to generate a supplemented metrics matrix 512. The supplemented metrics matrix 512 includes the metrics data included in the sparse metrics matrix 502 and imputed audience metrics values for the missing audience metrics values of the sparse metrics matrix 502.

Figure 6:
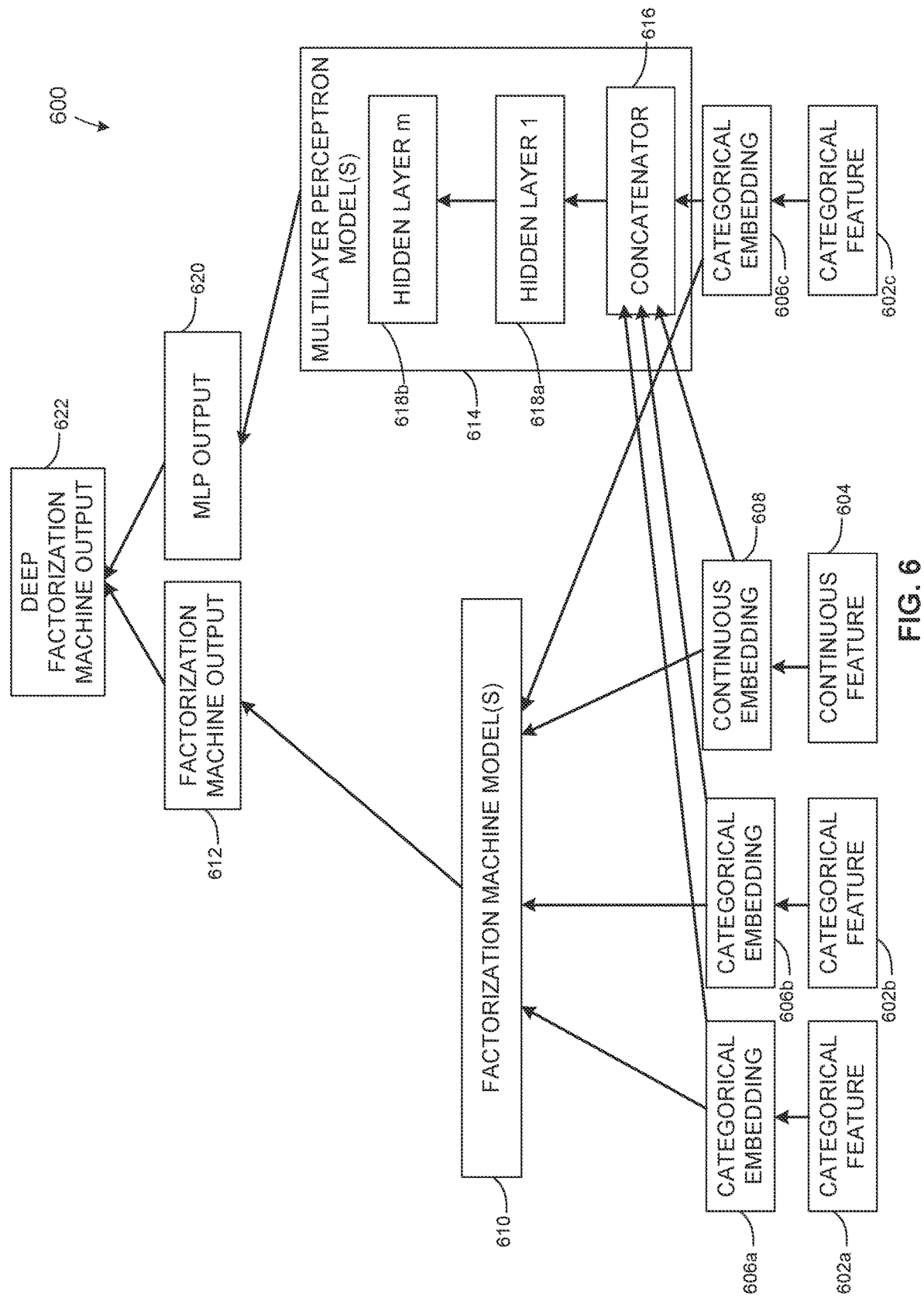
FIG. 6 is a block diagram of an example deep factorization machine to execute the missing value calculator circuitry of FIG. 3.

FIG. 6 is a block diagram of example deep factorization machine circuitry 600 to execute the missing value calculation circuitry 308 of FIG. 3. The example deep factorization machine circuitry 600 is a recommender system that includes capabilities to model low-order feature combinations using a factorization machine model (e.g., factorization machine model(s) 610) and high-order feature combinations using a deep neural network (e.g., multilayer perceptron (MLP) model(s) 614). The example factorization machine model(s) 610 is a recommender system model that can model low-order feature interactions. For example, the factorization machine model(s) 610 can model x-way variable interactions in which x is the number of a polynomial order. In some examples, x is set to two. The example multilayer perceptron model(s) 614 is implemented using a deep neural network that can capture high-order feature interactions and nonlinearities. The example multilayer perceptron model(s) 614 includes multiple layers of neurons, each fully connected to neurons in a layer below and fully connected to neurons in a layer above.

As explained above in conjunction with FIG. 3, the deep factorization machine circuitry 600 uses a plurality of feature groupings as an input. In some examples, the feature groupings are categorical (e.g., categorical features 602a, 602b, 602c). For example, a categorical feature 602a, 602b, 602c can be a brand category (e.g., children's toys, women's clothing, etc.) or a media type (e.g., a mobile website, a digital video, etc.). In some examples, the categorical features 602a, 602b, 602c are encoded using one-hot encoding.

In examples disclosed herein, one-hot encoding is an encoding strategy in which each one of a plurality of categorical features are represented by a binary column with rows representing items (e.g., media items). In one-hot encoding, 1 represents an item (e.g., media item) applies to the category and 0 represents the item (e.g., media item) does not apply to the category. In some examples, the feature groupings are continuous (e.g., a continuous feature 604). Example continuous features include non-categorical features such as video duration or product price.

For each one of the features (e.g., categorical feature 602a, continuous feature 604, etc.), the deep factorization machine circuitry 600 can learn an embedding. In some examples, the embedding is a categorical embedding (e.g., categorical embedding 606a) corresponding to a categorical feature (e.g., categorical feature 602a). In examples disclosed herein, a categorical embedding is a mapping of a discrete (e.g., categorical) feature to a vector of continuous numbers. In some examples, the embedding is a continuous embedding (e.g., the continuous embedding 608) corresponding to a continuous feature (e.g., the continuous feature 604). As the continuous feature is already continuous, t the example continuous feature (e.g., the continuous feature 604) can be mapped via a dense layer of k neurons matching a size of the categorical embeddings 606a, 606b, 606c.

In the example deep factorization machine circuitry 600, the categorical embeddings 606a-c and the continuous embedding 608 are input to the factorization machine model(s) 610. The example factorization machine model(s) 610 executes an algorithm using the categorical embeddings 606a-d and the continuous embedding 608 to generate a factorization machine output 612.

Also in the example deep factorization machine circuitry 600, the categorical embeddings 606a-c and the continuous embedding 608 are input to a concatenator 616 of the multilayer perceptron model(s) 614. The concatenator 616 concatenates the embeddings 606a-c, 608 to generate an input layer for the multilayer perceptron model(s) 614. The multilayer perceptron model(s) 614 analyzes the input layer through one or more hidden layer(s) shown as example hidden layer 1 618a through example hidden layer m 618b-. The example multilayer perceptron model(s) 614 generates an example MLP output 620. The example deep factorization machine circuitry 600 combines the factorization machine output 612 with the MLP output 620 to generate the example deep factorization machine output 622. In the example of FIG. 6, the deep factorization machine output 622 includes the supplemented transformed matrix 508 including the transformed audience metrics data of the sparse transformed matrix 506 and imputed transformed values corresponding to the missing audience metrics values of the sparse metrics matrix 502.

Figure 7:
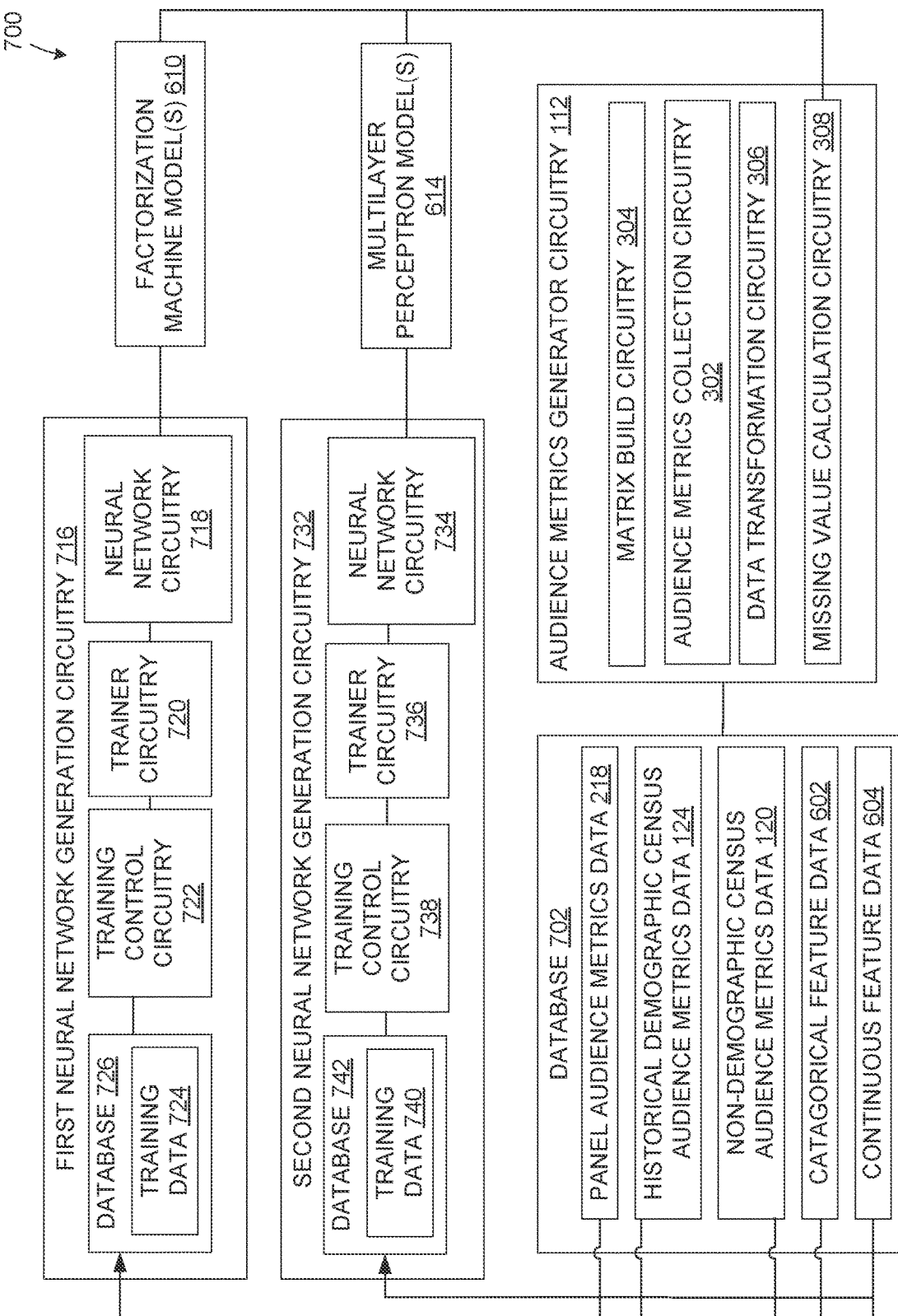
FIG. 7 is a block diagram of neural network generation circuitry to train neural network(s) to generate neural network model(s) for use by the example audience metrics generator circuitry of FIGS. 1, 2 and/or 3.

FIG. 7 is a block diagram of an example implementation of one or more computing systems to generate the neural network model(s) 610, 614 (FIG. 6) used by the example audience metrics generator circuitry 112 of FIGS. 1, 2 and/or 3 to generate audience metrics data.

As disclosed in connection with FIGS. 3 and 6, the missing value calculation circuitry 308 analyzes the panel audience metrics data 218, the historical demographic census audience metrics data 124, and the non-demographic census audience metrics data 120 to generate imputed audience metrics data to provide the missing values of the panel audience metrics data 218 and the non-demographic census audience metrics data 120. In examples disclosed herein, machine learning is used to improve efficiency of the missing value calculation circuitry 308 in imputing missing values in the audience metrics data (e.g., the panel audience metrics data 218 and the non-demographic census audience metrics data 120).

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model such as a Multi-Layer Perceptron (MLP) neural network is used. In general, machine learning models/architectures that are suitable to use in the example approaches disclosed herein will be MLP based neural networks. However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using garden descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In other examples, pre-trained model(s) are used. In some examples re-training may be performed.

Training is performed using training data. In examples disclosed herein, the training data originates from historical audience metrics data (e.g., panel audience metrics data 218, historical demographic census audience metrics data 124). Because supervised training is used, the training data is labeled.

Once training is complete, the model is deployed for use as an executable construct that processes an input and provides an output based on the network of nodes and connections defined in the model. The model(s) are stored at one or more databases (e.g., a database 702 of FIG. 7). The model may then be executed by the missing value calculation circuitry 308 of the example audience metrics generator circuitry 112 of FIGS. 1, 2 and/or 3 to generate supplemented audience metrics data (e.g., the supplemented transformed matrix 508 including the transformed audience metrics data of the sparse transformed matrix 506 and imputed transformed values corresponding to the missing audience metrics values of the sparse metrics matrix 502).

Once trained, a model may be deployed and operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, an output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring again to FIG. 7, the example system 700 includes first neural network generation circuitry 716 to train a neural network to generate imputed audience metrics data to fill in missing audience metrics data. The example first neural network generation circuitry 716 includes first neural network circuitry 718. In examples disclosed herein, the first neural network circuitry 718 implements a first neural network.

The example first neural network generation circuitry 716 of FIG. 7 also includes first neural network trainer circuitry 720. The example first neural network trainer circuitry 720 of FIG. 7 performs training of the neural network implemented by the first neural network circuitry 718.

The example first neural network generation circuitry 716 of FIG. 7 also includes first training control circuitry 722. The example training control circuitry 722 instructs the first neural network trainer circuitry 720 to perform training of the neural network based on first training data 724. In the example of FIG. 7, the first training data 724 used by the first neural network trainer circuitry 720 to train the neural network is stored in a database 726.

In the example of FIG. 7, the first training data 724 can include historical audience metrics data. The historical audience metrics data can be collected by the panel monitor system 102 and/or the census monitor system 106 of FIG. 1. Example historical audience metrics data can include the panel metrics data 218 and/or the historical demographic census audience metrics data 124 that is collected or generated by the panel monitor system 102 and/or the census monitor system 106.

The example first neural network trainer circuitry 720 trains the neural network implemented by the neural network processing circuitry 718 using the training data 724 to generate imputed audience metrics data to fill in missing audience metrics data. One or more factorization machine model(s) 610 are generated as a result of the neural network training. The factorization machine model(s) 610 are stored in the database 702. In other examples, the factorization machine model(s) 610 can be stored in a different database.

The example missing value calculation circuitry 308 of the example audience metrics generator circuitry 112 of FIGS. 1, 2, and/or 3 executes the factorization machine model(s) 610. In particular, the missing value calculation circuitry 308 executes the factorization machine model(s) 610 on the panel audience metrics data 218 and the non-demographic census audience metrics data 120. As a result of the execution of the factorization machine model(s) 610, the missing value calculation circuitry 308 generates the factorization machine output 612 of FIG. 6. The factorization machine output 612 is stored in the database 702. In some examples, the factorization machine output 612 is used as the training data 724 to refine the factorization machine model(s) 610.

The example audience metrics generator circuitry 112 of FIGS. 1, 2, and/or 3 executes a second neural network to generate additional imputed audience metrics data for missing audience metrics data. To execute such a second neural network, the example system 700 includes second neural network generation circuitry 732 to train the second neural network. The example second neural network generation circuitry 732 includes second neural network circuitry 734. In examples disclosed herein, the second neural network circuitry 734 implements a second neural network.

The example second neural network generation circuitry 732 of FIG. 7 includes second neural network trainer circuitry 736. The example second neural network trainer circuitry 736 of FIG. 7 performs training of the neural network implemented by the second neural network circuitry 734.

The example second neural network generation circuitry 732 of FIG. 7 also includes second training control circuitry 738. The example training control circuitry 738 instructs the second neural network trainer circuitry 736 to perform training of the neural network based on second training data 740. In the example of FIG. 7, the second training data 740 used by the second neural network trainer circuitry 736 to train the neural network is stored in a database 742.

In the example of FIG. 7, the second training data 740 can include historical audience metrics data. The historical audience metrics data can be collected by the panel monitor system 102 and/or the census monitor system 106 of FIG. 1. Example historical audience metrics data can include the panel metrics data 218 and/or the historical demographic census audience metrics data 124 that is collected or generated by the panel monitor system 102 and/or the census monitor system 106. In some examples, the first training data 724 is the same as the second training data 740.

The second neural network trainer circuitry 736 trains the neural network implemented by the neural network processing circuitry 734 using the training data 740 to generate imputed audience metrics data to fill in missing media metrics data. One or more multilayer perceptron model(s) 614 are generated as a result of the neural network training. The multilayer perceptron model(s) 614 are stored in the database 702. In other examples, the multilayer perceptron model(s) 614 can be stored in a different database.

The missing value calculation circuitry 308 of the example audience metrics generator circuitry 112 of FIGS. 1, 2, and/or 3 executes the multilayer perceptron model(s) 614. In particular, the missing value calculation circuitry 308 executes the multilayer perceptron model(s) 614 on the panel audience metrics data 218 and the non-demographic census audience metrics data 120. As a result of the execution of the multilayer perceptron model(s) 614, the missing value calculation circuitry 308 generates the MLP output 620. The MLP output 620 is stored in the database 702. In some examples, the MLP output 620 is used as the training data 740 to refine the multilayer perceptron model(s) 614.

In some examples, the audience metrics generator circuitry 112 includes means for accessing media exposure data. For example, the means for accessing may be implemented by media metrics collection circuitry 302. In some examples, the media metrics collection circuitry 302 may be implemented by machine executable instructions such as that implemented by at least blocks 802 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the media metrics collection circuitry 302 is implemented by other hardware logic circuitry, hardware implemented state machines, and/or any other combination of hardware, software, and/or firmware. For example, the media metrics collection circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for building a matrix of media exposure data. For example, the means for building may be implemented by the matrix build circuitry 304. In some examples, the matrix build circuitry 304 may be implemented by machine executable instructions such as that implemented by at least blocks 804 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the matrix build circuitry 304 is implemented by other hardware logic circuitry, hardware implemented state machines, and/or any other combination of hardware, software, and/or firmware. For example, the matrix build circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for transforming media exposure data. For example, the means for transforming may be implemented by the data transformation circuitry 306. In some examples, the data transformation circuitry 306 may be implemented by machine executable instructions such as that implemented by at least blocks 806 of FIG. 8, 902, 904, 906 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the data transformation circuitry 306 is implemented by other hardware logic circuitry, hardware implemented state machines, and/or any other combination of hardware, software, and/or firmware. For example, the data transformation circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for determining imputed values. For example, the means for determining may be implemented by the missing value calculation circuitry 308. In some examples, the missing value calculation circuitry 308 may be implemented by machine executable instructions such as that implemented by at least blocks 808 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the missing value calculation circuitry 308 is implemented by other hardware logic circuitry, hardware implemented state machines, and/or any other combination of hardware, software, and/or firmware. For example, the missing value calculation circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator circuitry 112 includes means for recovering media exposure data. For example, the means for transforming may be implemented by the data transformation circuitry 306. In some examples, the data transformation circuitry 306 may be implemented by machine executable instructions such as that implemented by at least blocks 810 of FIG. 8, 1002, 1004, 1006 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the data transformation circuitry 306 is implemented by other hardware logic circuitry, hardware implemented state machines, and/or any other combination of hardware, software, and/or firmware. For example, the data transformation circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audience metrics generating circuitry 112 of FIG. 1 is illustrated in FIG. 3, one or more of the elements, processes, and/or devices illustrated in FIG. 3 may be combined, divided, re-arranged, omitted, eliminated, and/or implemented in any other way. Further, the example media metrics collection circuitry 302, the example matrix build circuitry 304, the example data transforming circuitry 306, the example missing value calculation circuitry 308 and/or, more generally, the example audience metrics generating circuitry 112 of FIG. 1, may be implemented by hardware, software, firmware, and/or any combination of hardware, software, and/or firmware. Thus, for example, any of the example media metrics collection circuitry 302, the example matrix build circuitry 304, the example data transforming circuitry 306, the example missing value calculation circuitry 308, and/or, more generally, the example audience metrics generating circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example media metrics collection circuitry 302, the example matrix build circuitry 304, the example data transforming circuitry 306, the example missing value calculation circuitry 308 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audience metrics generating circuitry 112 of FIG. 1 may include one or more elements, processes, and/or devices in addition to, or instead of, those illustrated in FIG. 3, and/or may include more than one of any or all of the illustrated elements, processes and devices.

Figure 8:
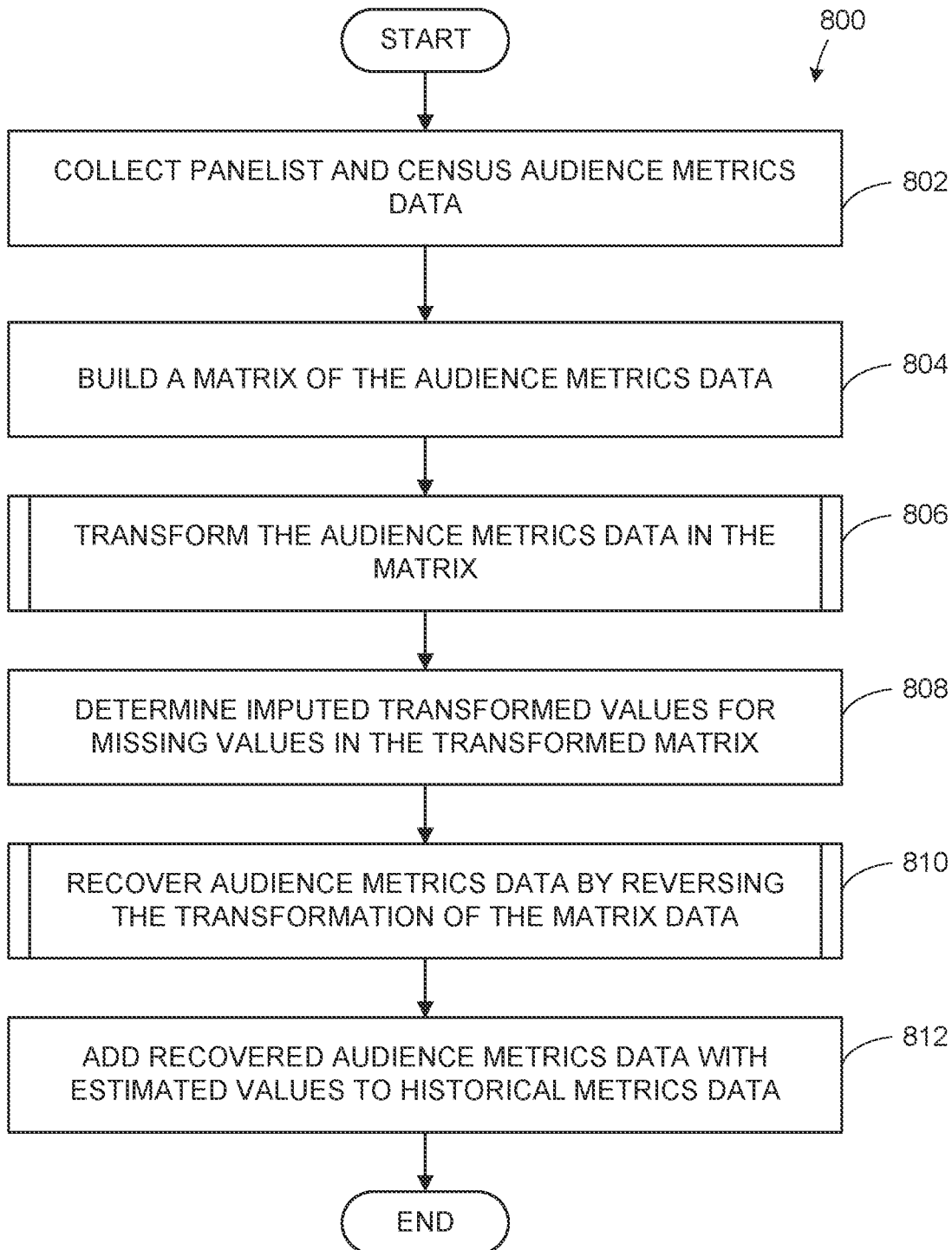
FIG. 8 is a flowchart representative of example machine readable instructions that may be executed by example processor circuitry to implement the example audience metrics generator circuitry of FIGS. 1, 2 and/or 3 to determine missing values of audience metrics data.
Figure 9:
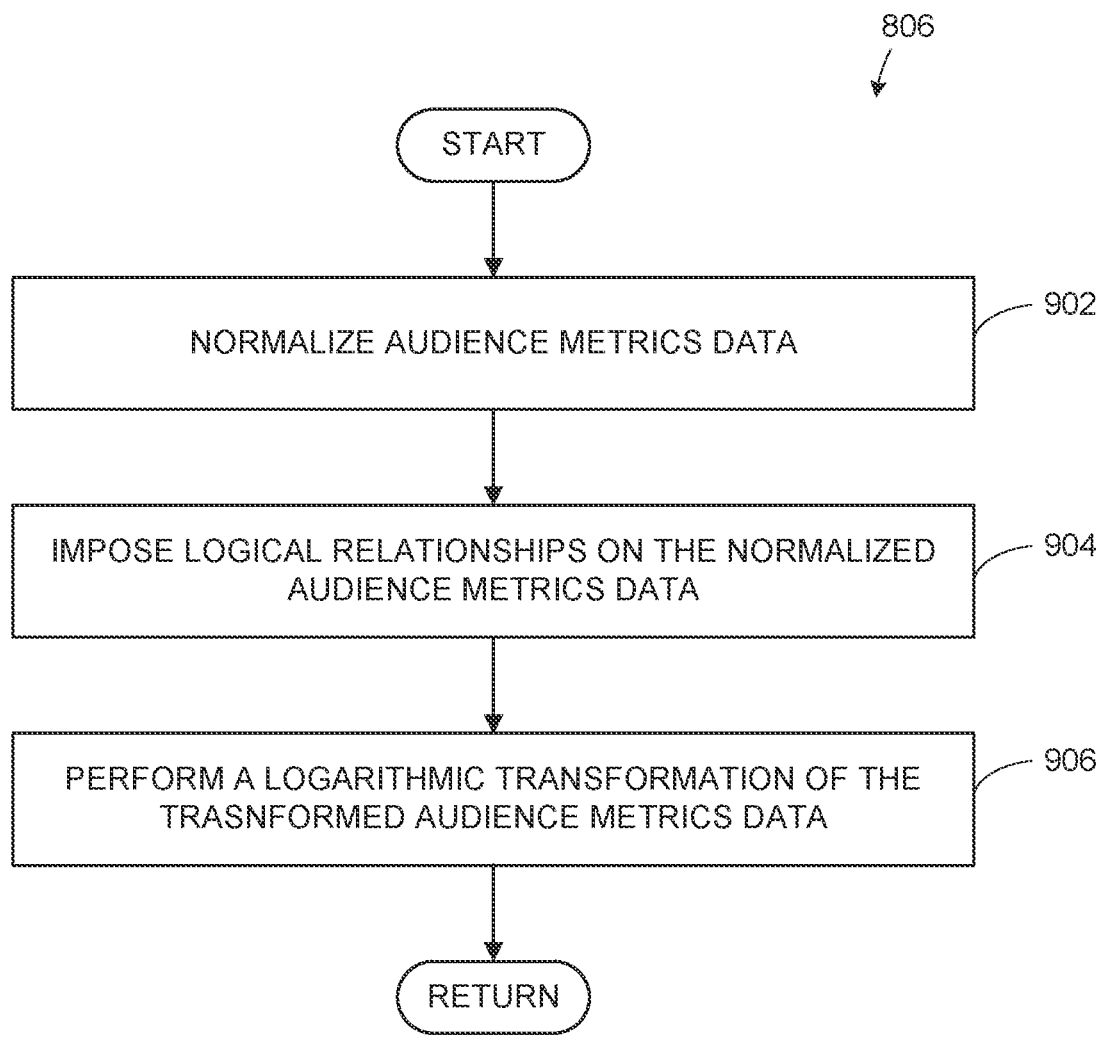
FIG. 9 is a flowchart representative of example machine readable instructions that may be executed by example processor circuitry to implement the example audience metrics generator circuitry of FIGS. 1, 2 and/or 3 to transform matrix data.
Figure 10:
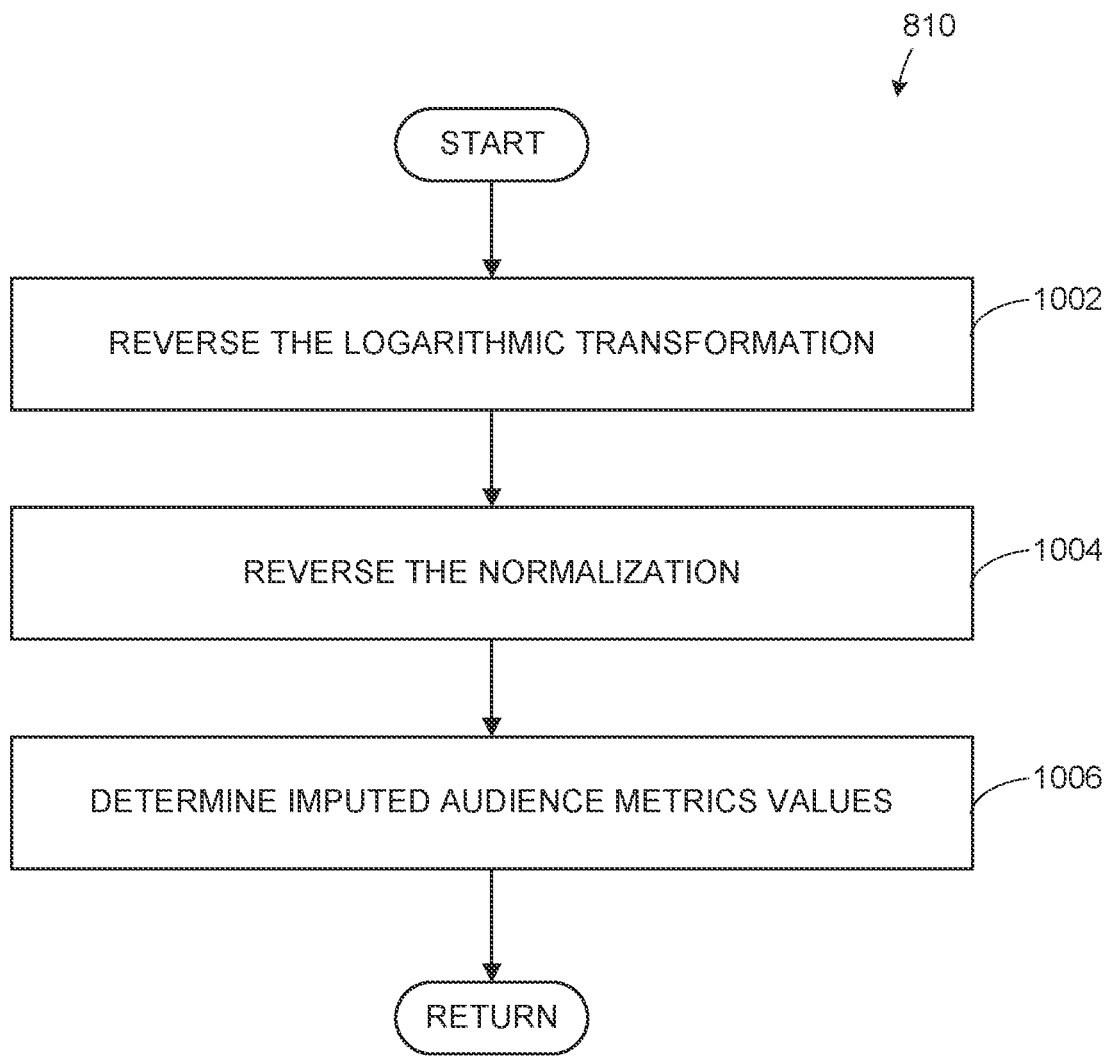
FIG. 10 is a flowchart representative of example machine readable instructions that may be executed by example processor circuitry to implement the example audience metrics generator circuitry of FIGS. 1, 2 and/or 3 to recover audience metrics data.

A flowchart representative of example hardware logic circuitry, machine readable instructions, hardware implemented state machines, and/or any combination thereof for implementing the audience metrics generating circuitry 112 of FIG. 1 is shown in FIG. 8. A flowchart representative of example hardware logic circuitry, machine readable instructions, hardware implemented state machines, and/or any combination thereof for implementing the data transformation circuitry 306 of FIG. 3 is shown in FIG. 9. A flowchart representative of example hardware logic circuitry, machine readable instructions, hardware implemented state machines, and/or any combination thereof for implementing the data transformation circuitry 306 of FIG. 1 is shown in FIG. 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8-10, many other methods of implementing the example audience metrics generator circuitry 112 and/or the example data transformation circuitry 306 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to generate audience metrics data. The machine readable instructions and/or operations 800 of FIG. 8 begin at block 802, at which the example audience metrics collection circuitry 302 (FIG. 3) collects panelist and census metrics data. For example, the audience metrics collection circuitry 302 receives the panel audience metrics data 218 from the panel monitor system 102. The example audience metrics collection circuitry 302 can receive the non-demographic census audience metrics data 120 from the census monitor system 106. In some examples, the audience metrics collection circuitry 302 receives historical audience metrics data such as the historical census data 122 from the census monitor system 106.

At block 804, the example matrix build circuitry 304 (FIG. 3) of the example audience metrics generator circuitry 112 of FIGS. 1, 2 and/or 3 builds a matrix of the audience metrics data collected by the audience metrics collection circuitry 302. For example, the matrix build circuitry 304 compiles the panel audience metrics data 218, the non-demographic census audience metrics data 120 and the historical census data 122 into the sparse metrics matrix 502 (FIG. 5). At block 806, the data transformation circuitry 306 (FIGS. 3-5 and 7) of the example audience metrics generating circuitry 112 transforms the data in the sparse metrics matrix 502 to prepare the sparse metrics matrix 502 for the recommender system of the missing value calculation circuitry 308 (FIG. 3). Example instructions that may be used to implement the data transformation of block 806 are discussed below in conjunction with FIG. 9. As a result of the operations of block 806, the data transforming circuitry 306 generates the sparse transformed matrix 506 (FIG. 5).

At block 808, the example missing value calculation circuitry 308 determines imputed transformed values for the missing values in the sparse transformed matrix 606 using the recommender system. For example, the missing value calculation circuitry 308 can process the sparse transformed matrix 606 with a sparse matrix factorization model to obtain estimated audience metrics values for missing audience metrics values in the sparse transformed matrix 606. In other examples, the missing value calculation circuitry 308 can process the matrix with a deep factorization machine (e.g., the deep factorization machine circuitry 600) to obtain imputed audience metrics values for missing audience metrics values. In some examples, generating imputed audience metrics values for the missing audience metrics values is based on feature categorization of the media items. As a result of the operations of block 808, the missing value calculation circuitry 308 generates the supplemented transformed matrix 508 (FIG. 5).

At block 810, the example data transformation circuitry 306 of the example audience metrics generating circuitry 112 recovers imputed audience metrics data by reversing the transformation of the matrix data. Example instructions to implement the data recovery of block 810 are discussed below in conjunction with FIG. 10. As a result of the operations of block 810, the data transformation circuitry 306 generates the supplemented metrics matrix 512 (FIG. 5). In some examples, the supplemented metrics matrix 512 includes the supplemented panel audience metrics data 202 (e.g., the supplemental panel audience sizes 204, the supplemental panel impression counts 206, the supplemental panel duration times 208 of FIG. 2). In some examples, the supplemental metrics matrix 512 includes the supplemental census audience metrics data 210 (e.g., the supplemental census audience sizes 212, the supplemental census impression counts 214, the supplemental census duration times 216 of FIG. 2). In some examples, the supplemental metrics matrix 512 includes both the supplemental panel metrics data 202 and the supplemental census metrics data 210.

At block 812, the example audience metrics generator circuitry 112 returns the supplemented audience metrics data to the monitor systems (e.g., the panel monitor system 102 and the census monitor system 106 of FIGS. 1 and 2). The panel monitor system computer 110 and the census monitor system computer 130 can add the supplemented audience metrics data to the panel monitor system database 125 and/or the census monitor system database 132. The example instructions of FIG. 8 end.

FIG. 9 is a flowchart representative of the example machine readable instructions and/or example operations 806 of FIG. 8 that may be executed and/or instantiated by processor circuitry to transform audience metrics data. The machine readable instructions and/or operations 806 of FIG. 9 begin at block 902, at which the example data transformation circuitry 306 (FIGS. 3-5 and 7) normalizes the audience metrics data. For example, the data transformation circuitry 306 can apply a normalization transformation to the sparse metrics matrix 502 (FIG. 5) received from the matrix build circuitry 304. At block 904, the example data transformation circuitry 306 imposes logical relationships on the normalized audience metrics data. In some examples, the normalization transformation accounts for logical relationships of the audience metrics data. For example, the data transformation circuitry 306 can apply Equations 17-22 above to the sparse metrics matrix 502 to both normalize and impose logical relationships. As a result of the operations of blocks 902 and 904, the data transformation circuitry 306 can generate the sparse normalized matrix 504 (FIG. 5). At block 906, the example data transformation circuitry 306 transforms the normalized audience metrics data. For example, the data transformation circuitry 306 can perform a log transformation on the sparse normalized matrix 504 to generate the sparse transformed matrix 506 (FIG. 5). In some examples, the transformation is to prepare the audience metrics data for processing by a recommender system. The example instructions of FIG. 9 end.

FIG. 10 is a flowchart representative of the example machine readable instructions and/or example operations 810 of FIG. 8 that may be executed and/or instantiated by processor circuitry to recover audience media metrics data. The machine readable instructions and/or operations 810 of FIG. 10 begin at block 1002, at which the example log transformation circuitry 404 (FIG. 4) of the data transformation circuitry 306 (FIGS. 3-5 and 7) reverses the log transformation of the audience metrics matrix. For example, the log transformation circuitry 404 raises the audience metrics data in the supplemented transformed matrix 508 (FIG. 5) to exponents to generate the supplemented normalized matrix 510 (FIG. 5). At block 1004, the example normalization circuitry 402 (FIG. 4) of the data transformation circuitry 306 reverses the normalization. For example, the normalization circuitry 402 applies Equations 23-25 above to the supplemented transformed matrix 508 to reverse the normalization. At block 1006, the example normalization circuitry 402 determines imputed audience metrics values. For example, the normalization circuitry 402 can apply Equations 26-28 above to the supplemented normalized matrix 510 to generate the supplemented metrics matrix 512 (FIG. 5) and, thus, recover the imputed audience metrics values for the missing audience metrics values of the sparse metrics matrix 502 (FIG. 5). The example instructions of FIG. 10 end.

Figure 11:
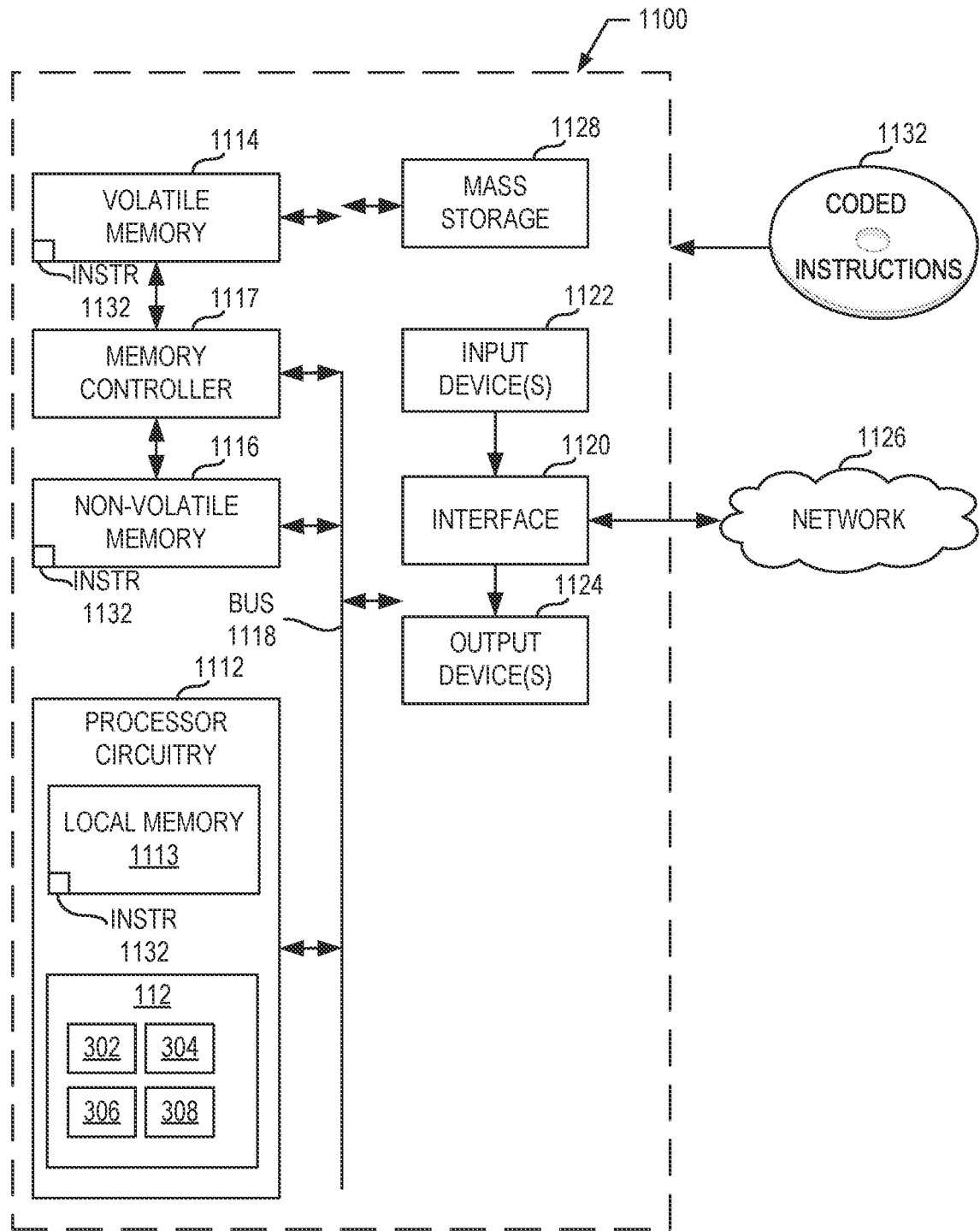
FIG. 11 is a block diagram of an example processing platform including processor circuitry structured to execute the example machine readable instructions of FIGS. 8-10 to implement the example audience metrics generator circuitry of FIGS. 1, 2 and/or 3 to determine missing values of audience metrics data.

FIG. 11 is a block diagram of an example processor platform 1100 structured to execute and/or instantiate the machine readable instructions and/or operations of FIGS. 8-10 to implement the audience metrics generating circuitry of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the audience metrics generator circuitry 112 (FIGS. 1-3), the media metrics collection circuitry 302, the matrix build circuitry 304, the data transformation circuitry 306, and the missing value calculation circuitry 308.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 8-10, may be stored in the mass storage device 1128, in the volatile memory 1114, in the non-volatile memory 1116, and/or on a removable non-transitory computer readable storage medium such as a CD or DVD.

Figure 12:
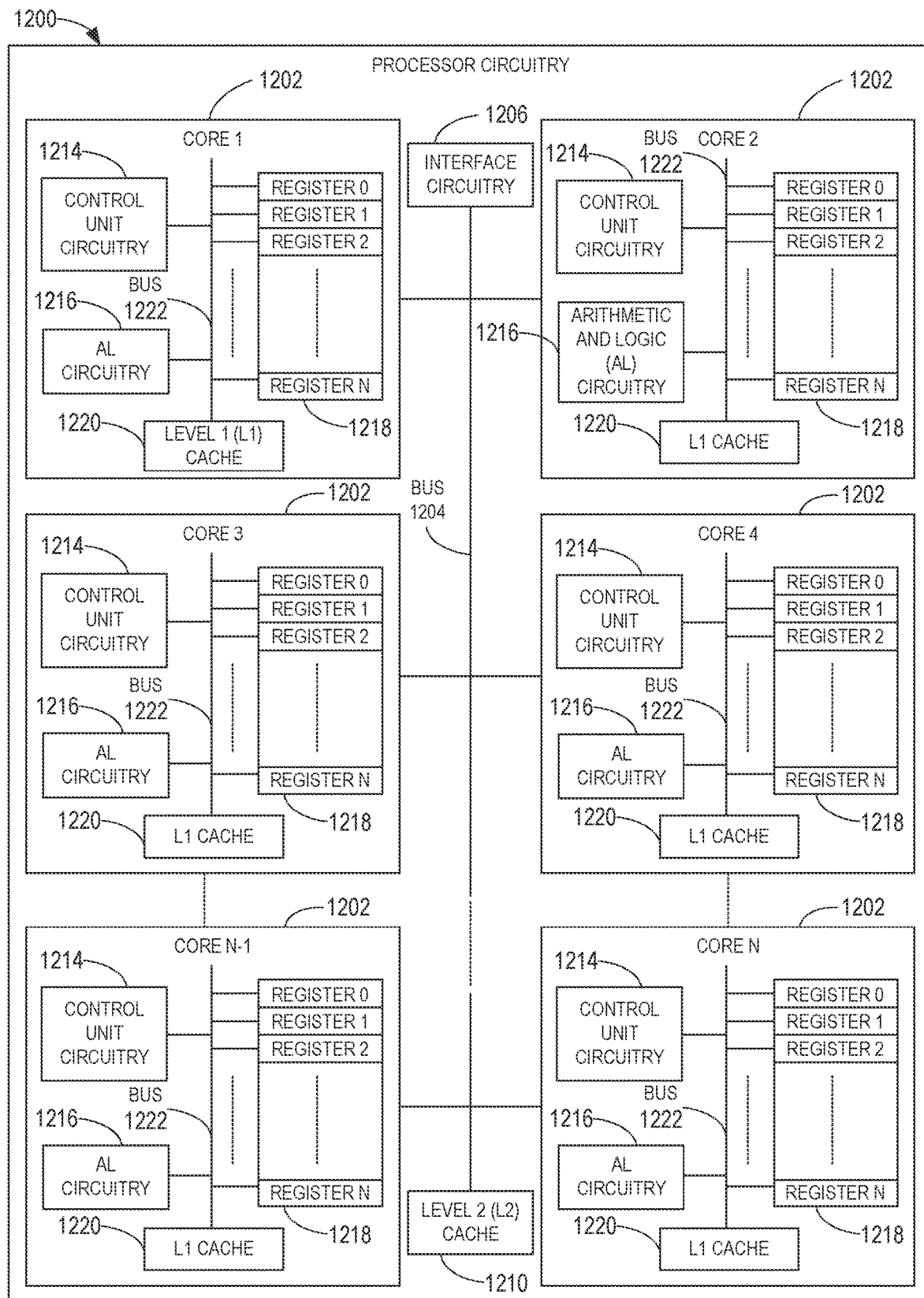
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIG. 8.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
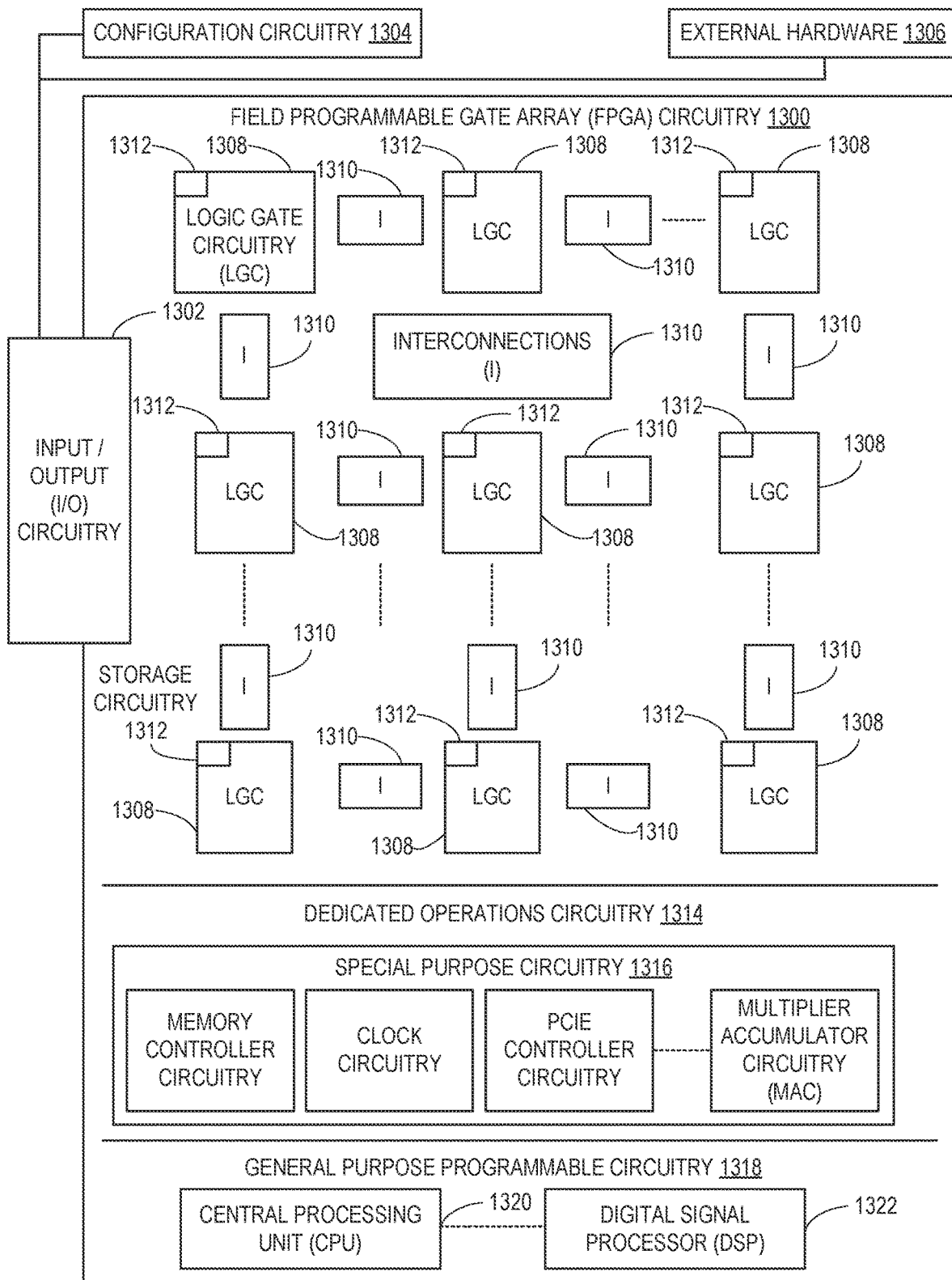
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowchart of FIG. 8 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowchart of FIG. 8. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1300 may be structured to effectively instantiate some or all of the machine readable instructions of the flowchart of FIG. 8 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIG. 8 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIG. 8 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowchart of FIG. 8 may be executed by one or more of the cores 1202 of FIG. 12 and a second portion of the machine readable instructions represented by the flowchart of FIG. 8 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
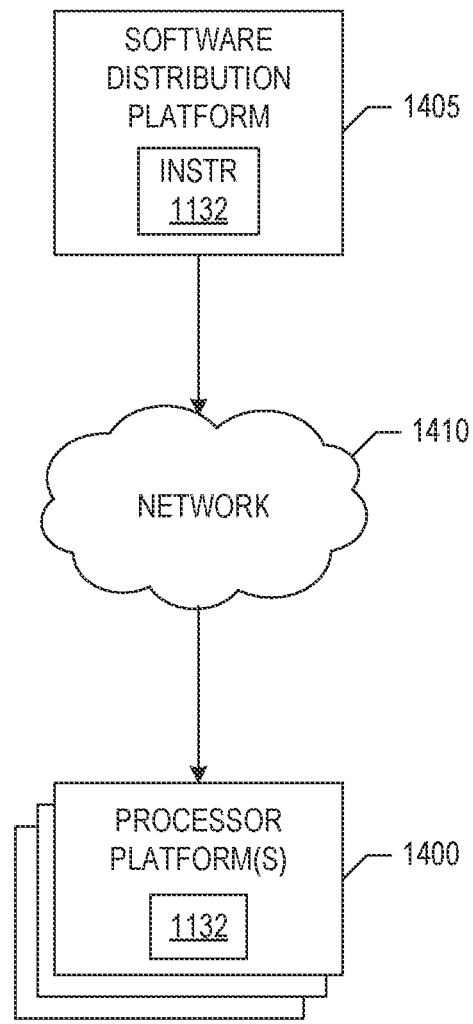
FIG. 14 is a block diagram of an example software distribution platform (e.g., one or more servers) to distribute software (e.g., software corresponding to the example machine readable instructions of FIGS. 8, 9 and 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 1132 of FIGS. 11 as described above. The one or more servers of the example software distribution platform 1405 are in communication with a network 1410, which may correspond to any one or more of the Internet and/or any of the example networks 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 800 of FIG. 8, may be downloaded to the example processor platform 1400, which is to execute the machine readable instructions 1132 to implement the audience metrics generating circuitry 112. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that generate audience metrics data. Traditional techniques for generating audience metrics data result in sparsely populated audience metrics data in which metrics are known for only a subset of demographic groups for each of media item under analysis. Examples disclosed herein alleviate the problems associated with such traditional techniques by determining audience metrics for each demographic group for each of media item under analysis by imputing missing audience metric values of the sparsely populated audience metrics data. As such, examples disclosed herein overcome limitations of a computer being unable to recognize and supply missing data by supplying computers with circuitry and/or programming that enable such computers to generate imputed audience metrics data. The disclosed systems, methods, apparatus, and articles of manufacture are accordingly directed to one or more improvement(s) in the operation of a machine such as a computer or other electronic and/or mechanical device.

Example apparatus, systems, and methods for generating audience metrics using matrix analysis are disclosed herein. Further examples and combinations thereof include the following:

Example 1 includes an apparatus including audience metrics collecting circuitry to access first audience metrics from a server; and access second audience metrics from the server; matrix building circuitry to build a matrix of the first audience metrics and the second audience metrics, missing values of the matrix corresponding to the second audience metrics; data transforming circuitry to transform the first audience metrics and the second audience metrics in the matrix; missing value calculating circuitry to determine imputed transformed values of the missing values using a recommender system; and the data transforming circuitry to recover imputed values of the missing values based on the imputed transformed values.

Example 2 includes the apparatus of example 1, wherein the first audience metrics include a first audience size, a first impression count, and first duration data, and the second audience metrics include a second audience size, a second impression count, and second duration data.

Example 3 includes the apparatus of example 1, wherein a first portion of the first audience metrics corresponds to panelist audience members for whom first demographic information is known and a second portion of the first audience metrics corresponds to census audience members for whom second demographic information is known.

Example 4 includes the apparatus of example 1, wherein a first portion of the second audience metrics corresponds to panelist audience members for whom first demographic information is known and a second portion of the second audience metrics corresponds to census audience members for whom second demographic information is unknown.

Example 5 includes the apparatus of example 4, wherein first ones of the missing values correspond to the second audience metrics for the panelist audience members and second ones of the missing values correspond to the census audience members.

Example 6 includes the apparatus of example 1, wherein the data transforming circuitry is to transform the first audience metrics and the second audience metrics by generating normalized metrics by normalizing the first and second audience metrics in the matrix to a universe estimate; logically transforming the normalized metrics to generate logically transformed metrics; and performing a logarithmic transformation of the logically transformed metrics.

Example 7 includes the apparatus of example 1, wherein the missing value calculating circuitry is to determine the imputed transformed values using logarithmic transformation.

Example 8 includes the apparatus of example 7, wherein the data transforming circuitry is to recover the imputed values by determining normalized imputed values by raising the imputed transformed values to exponents; and recovering final imputed values for the missing values based on the normalized imputed values.

Example 9 includes the apparatus of example 1, wherein the missing value calculating circuitry is to determine the imputed transformed values using sparse matrix factorization as the recommender system.

Example 10 includes the apparatus of example 1, wherein the missing value calculating circuitry is to determine the imputed transformed values using a deep factorization machine as the recommender system.

Example 11 includes an apparatus comprising at least one memory; instructions in the apparatus; and processor circuitry to execute the instructions to access first audience metrics from a server; access second audience metrics from the server; build a matrix of the first audience metrics and the second audience metrics, missing values of the matrix corresponding to the second audience metrics; transform the first audience metrics and the second audience metrics in the matrix; determine imputed transformed values of the missing values using a recommender system; and recover imputed values of the missing values based on the imputed transformed values.

Example 12 includes the apparatus of example 11, wherein the first audience metrics include a first audience size, a first impression count, and first duration data, and the second audience metrics include a second audience size, a second impression count, and second duration data.

Example 13 includes the apparatus of example 11, wherein a first portion of the first audience metrics corresponds to panelist audience members for whom first demographic information is known and a second portion of the first audience metrics corresponds to census audience members for whom second demographic information is known.

Example 14 includes the apparatus of example 11, wherein a first portion of the second audience metrics corresponds to panelist audience members for whom first demographic information is known and a second portion of the second audience metrics corresponds to census audience members for whom second demographic information is unknown.

Example 15 includes the apparatus of example 14, wherein first ones of the missing values correspond to the second audience metrics for the panelist audience members and second ones of the missing values correspond to the census audience members.

Example 16 includes the apparatus of example 11, wherein the processor circuitry is to execute the instructions to transform the first audience metrics and the second audience metrics by generating normalized metrics by normalizing the first and second audience metrics in the matrix to a universe estimate; logically transforming the normalized metrics to generate logically transformed metrics; and performing a logarithmic transformation of the logically transformed metrics.

Example 17 includes the apparatus of example 11, wherein the processor circuitry is to execute the instructions to determine the imputed transformed values using logarithmic transformation.

Example 18 includes the apparatus of example 17, wherein the processor circuitry is to execute the instructions to recover the imputed values by determining normalized imputed values by raising the imputed transformed values to exponents; and recovering final imputed values for the missing values based on the normalized imputed values.

Example 19 includes the apparatus of example 11, wherein the processor circuitry is to execute the instructions to determine the imputed values of the missing values using sparse matrix factorization as the recommender system.

Example 20 includes the apparatus of example 11, wherein the processor circuitry is to execute the instructions to determine the imputed values of the missing values using a deep factorization machine as the recommender system.

Example 21 includes at least one non-transitory computer readable storage medium comprising instructions that, when executed, cause processor circuitry to at least access first audience metrics from a server; and access second audience metrics from the server; build a matrix of the first audience metrics and the second audience metrics, missing values of the matrix corresponding to the second audience metrics; transform the first audience metrics and the second audience metrics in the matrix; determine imputed transformed values of the missing values using a recommender system; and recover imputed values of the missing values based on the imputed transformed values.

Example 22 includes the at least one non-transitory computer readable storage medium of example 21, wherein the first audience metrics include a first audience size, a first impression count, and first duration data, and the second audience metrics include a second audience size, a second impression count, and second duration data.

Example 23 includes the at least one non-transitory computer readable storage medium of example 21, wherein a first portion of the first audience metrics corresponds to panelist audience members for whom first demographic information is known and a second portion of the first audience metrics corresponds to census audience members for whom second demographic information is known.

Example 24 includes the at least one non-transitory computer readable storage medium of example 21, wherein a first portion of the second audience metrics corresponds to panelist audience members for whom first demographic information is known and a second portion of the second audience metrics corresponds to census audience members for whom second demographic information is unknown.

Example 25 includes the at least one non-transitory computer readable storage medium of example 24, wherein first ones of the missing values correspond to the second audience metrics for the panelist audience members and second ones of the missing values correspond to the census audience members.

Example 26 includes the at least one non-transitory computer readable storage medium of example 21, wherein the instructions, when executed, cause the processor circuitry to transform the first audience metrics and the second audience metrics by generating normalized metrics by normalizing the first and second audience metrics in the matrix to a universe estimate; logically transforming the normalized metrics to generate logically transformed metrics; and performing a logarithmic transformation of the logically transformed metrics.

Example 27 includes the at least one non-transitory computer readable storage medium of example 21, wherein the instructions, when executed, cause the processor circuitry to determine the imputed transformed values using logarithmic transformation.

Example 28 includes the at least one non-transitory computer readable storage medium of example 27, wherein the instructions, when executed, cause the processor circuitry to recover the imputed values by determining normalized imputed values by raising the imputed transformed values to exponents; and recovering final imputed values for the missing values based on the normalized imputed values.

Example 29 includes the at least one non-transitory computer readable storage medium of example 21, wherein the instructions, when executed, cause the processor circuitry to determine the imputed transformed values of the missing values using sparse matrix factorization as the recommender system.

Example 30 includes the at least one non-transitory computer readable storage medium of example 21, wherein the instructions, when executed, cause the processor circuitry to determine the imputed transformed values of the missing values using a deep factorization machine as the recommender system.

Example 31 includes a method comprising accessing first audience metrics from a server; accessing second audience metrics from the server; building a matrix of the first audience metrics and the second audience metrics, missing values of the matrix corresponding to the second audience metrics; transforming the first audience metrics and the second audience metrics in the matrix; determining imputed transformed values of the missing values using a recommender system; and recovering imputed values of the missing values based on the imputed transformed values.

Example 32 includes the method of example 31, wherein the first audience metrics include a first audience size, a first impression count, and first duration data, and the second audience metrics include a second audience size, a second impression count, and second duration data.

Example 33 includes the method of example 31, wherein a first portion of the first audience metrics corresponds to panelist audience members for whom first demographic information is known and a second portion of the first audience metrics corresponds to census audience members for whom second demographic information is known.

Example 34 includes the method of example 31, wherein a first portion of the second audience metrics corresponds to panelist audience members for whom first demographic information is known and a second portion of the second audience metrics corresponds to census audience members for whom second demographic information is unknown.

Example 35 includes the method of example 34, wherein first ones of the missing values correspond to the second audience metrics for the panelist audience members and second ones of the missing values correspond to the census audience members.

Example 36 includes the method of example 31, further including transforming the first audience metrics and the second audience metrics by generating normalized metrics by normalizing the first and second audience metrics in the matrix to a universe estimate; logically transforming the normalized metrics to generate logically transformed metrics; and performing a logarithmic transformation of the logically transformed metrics.

Example 37 includes the method of example 31, further including determining the imputed transformed values using logarithmic transformation.

Example 38 includes the method of example 37, further including recovering the imputed values by determining normalized imputed values by raising the imputed transformed values to exponents; and recovering final imputed values for the missing values based on the normalized imputed values.

Example 39 includes the method of example 31, further including determining the imputed transformed values of the missing values using sparse matrix factorization as the recommender system.

Example 40 includes the method of example 31, further including determining the imputed transformed values of the missing values using a deep factorization machine as the recommender system.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:
1. An audience measurement system comprising:
a panel monitor server configured to:
receive network communications identifying media items presented at client devices of panelists of an audience measurement entity, wherein the media items are tagged with beacon instructions that are downloaded to the client devices when the client devices access the media items, the beacon instructions to cause the client devices to transmit the network communications to the panel monitor server,
based on the network communications received from the client devices in accordance with the beacon instructions, log demographic impressions of the media items in association with known demographic data for the panelists, and
generate panelist audience metrics based on the demographic impressions;
a computing system comprising at least on processor and a memory, the computing system configured to:
access the panelist audience metrics from the panel monitor server,
access, from a census monitor server, census audience metrics generated based on census impressions of the media items logged by the census monitor server, wherein demographic data for users that accessed the media items was not logged by the census monitor server in association with the census impressions,
build a sparse matrix of the panelist audience metrics and the census audience metrics, wherein the sparse matrix comprises missing audience metrics values for a portion of demographic groups and for a portion of the media items, and wherein the sparse matrix comprises computer-generated audience metrics data bias represented by the missing audience metrics values, normalize the panelist audience metrics and the census audience metrics in the sparse matrix to generate a sparse transformed matrix, apply a recommender model to the sparse transformed matrix to predict audience metrics values corresponding to the missing audience metrics, generate a supplemented transformed matrix comprising the predicted audience metrics values and audience metrics values from the sparse transformed matrix, perform reverse transformations of the supplemented transformed matrix to generate a completed audience metrics matrix, and transmit audience data to the panel monitor server and the census monitor server to cause the panel monitor server and the census monitor server to update respective audience metrics databases.

2. The audience measurement system of claim 1, wherein the panelist audience metrics include a first audience size, a first impression count, and first duration data, and the census audience metrics include a second audience size, a second impression count, and second duration data.

3. The audience measurement system of claim 1, wherein normalizing the panelist audience metrics and the census audience metrics in the sparse matrix to generate a sparse transformed matrix comprises:

normalizing the panelist audience metrics and the census audience metrics to a universe estimate;

logically transforming the normalized metrics to generate logically transformed metrics; and performing a logarithmic transformation of the logically transformed metrics to generate the sparse transformed matrix.

4. The audience measurement system of claim 1, wherein the recommender model comprises a deep factorization machine.

5. The audience measurement system of claim 1, wherein the recommender model comprises a multilayer neural network.

6. The audience measurement system of claim 1, wherein the media items are streaming media items.

7. The audience measurement system of claim 1, further comprising the census monitor server.

8. At least one non-transitory computer readable storage medium comprising instructions that, when executed, cause at least one processor to perform operations comprising:

receiving, at a panel monitor server, network communications identifying media items presented at client devices of panelists of an audience measurement entity, wherein the media items are tagged with beacon instructions that are downloaded to the client devices when the client devices access the media items, the beacon instructions to cause the client devices to transmit the network communications to the panel monitor server;

based on the network communications received from the client devices in accordance with the beacon instructions, logging demographic impressions of the media items in association with known demographic data for the panelists;

generating panelist audience metrics based on the demographic impressions;

accessing the panelist audience metrics from the panel monitor server;

accessing, from a census monitor server, census audience metrics generated based on census impressions of the media items logged by the census monitor server, wherein demographic data for users that accessed the media items was not logged by the census monitor server in association with the census impressions;

building a sparse matrix of the panelist audience metrics and the census audience metrics, wherein the spare matrix comprises missing audience metrics values for a portion of demographic groups and or a portion of the media items, and wherein the sparse matrix comprises computer-generated audience metrics data bias represented by the missing audience metrics values;

normalizing the panelist audience metrics and the census audience metrics in the sparse matrix to generate a sparse transformed matrix;

applying a recommender model to the sparse transformed matrix to predict audience metrics values corresponding to the missing audience metrics;

generating a supplemented transformed matrix comprising the predicted audience metrics values and audience metrics values from the sparse transformed matrix;

performing reverse transformations of the supplemented transformed matrix to generate a completed audience metrics matrix; and transmitting audience metrics data to the panel monitor server and the census monitor server to cause the panel monitor server and the census monitor server to update respective audience metrics databases.

9. The at least one non-transitory computer readable storage medium of claim 8, wherein the panelist audience metrics include a first audience size, a first impression count, and first duration data, and the census audience metrics include a second audience size, a second impression count, and second duration data.

10. The at least one non-transitory computer readable storage medium of claim 8, wherein normalizing the panelist audience metrics and the census audience metrics in the sparse matrix to generate a sparse transformed matrix comprises:

normalizing the panelist audience metrics and the census audience metrics to a universe estimate;

logically transforming the normalized metrics to generate logically transformed metrics; and performing a logarithmic transformation of the logically transformed metrics to generate the sparse transformed matrix.

11. The at least one non-transitory computer readable storage medium of claim 8, wherein the recommender model comprises a deep factorization machine.

12. The at least one non-transitory computer readable storage medium of claim 8, wherein the recommender model comprises a multilayer neural network.

13. The at least one non-transitory computer readable storage medium of claim 8, wherein the media items are streaming media items.

14. The at least one non-transitory computer readable storage medium of claim 8, wherein the client devices comprise smartphones.

15. A method comprising:

receiving, by a panel monitor server, network communications identifying media items presented at client devices of panelists of an audience measurement entity, wherein the media items are tagged with beacon instructions that are downloaded to the client devices when the client devices access the media items, the beacon instructions to cause the client devices to transmit the network communications to the panel monitor server;

based on the network communications received from the client devices in accordance with the beacon instructions, logging, by the panel monitor server, demographic impressions of the media items in association with known demographic data for the panelists;

generating, by the panel monitor server, panelist audience metrics based on the demographic impressions;

accessing, by a computing system different from the panel monitor server, the panelist audience metrics from the panel monitor server;

accessing, by the computing system, from a census monitor server, census audience metrics generated based on census impressions of the media items logged by the census monitor server, wherein demographic data for users that accessed the media items was not logged by the census monitor server in association with the census impressions;

building, by the computing system, a sparse matrix of the panelist audience metrics and the census audience metrics, wherein the spare matrix comprises missing audience metrics values for a portion of demographic groups and or a portion of the media items, and wherein the sparse matrix comprises computer-generated audience metrics data bias represented by the missing audience metrics values;

normalizing, by the computing system, the panelist audience metrics and the census audience metrics in the sparse matrix to generate a sparse transformed matrix;

applying, by the computing system, a recommender model to the sparse transformed matrix to predict audience metrics values corresponding to the missing audience metrics;

generating, by the computing system, a supplemented transformed matrix comprising the predicted audience metrics values and audience metrics values from the sparse transformed matrix;

performing by the computing system, reverse transformations of the supplemented transformed matrix to generate a completed audience metrics matrix; and transmitting by the computing system, audience metrics data to the panel monitor server and the census monitor server to cause the panel monitor server and the census monitor server to update respective audience metrics databases.

16. The method of claim 15, wherein normalizing the panelist audience metrics and the census audience metrics in the sparse matrix to generate a sparse transformed matrix comprises:

normalizing the panelist audience metrics and the census audience metrics to a universe estimate;

logically transforming the normalized metrics to generate logically transformed metrics; and performing a logarithmic transformation of the logically transformed metrics to generate the sparse transformed matrix.

17. The method of claim 15, wherein the recommender model comprises a deep factorization machine.

18. The method of claim 15, wherein the recommender model comprises a multilayer neural network.

19. The method of claim 15, wherein the media items are streaming media items.

20. The method of claim 15, wherein the panelist audience metrics include a first audience size, a first impression count, and first duration data, and the census audience metrics include a second audience size, a second impression count, and second duration data.

* * * * *